United States Patent
Morra et al.

(10) Patent No.: US 11,602,147 B2
(45) Date of Patent: Mar. 14, 2023

(54) NEMATODE CONTROL

(71) Applicant: University of Idaho, Moscow, ID (US)

(72) Inventors: Matthew J. Morra, Moscow, ID (US); Louise-Marie Dandurand, Moscow, ID (US); Inna E. Popova, Moscow, ID (US)

(73) Assignee: University of Idaho, Moscow, ID (US)

( * ) Notice: Subject to any disclaimer, the term of this patent is extended or adjusted under 35 U.S.C. 154(b) by 207 days.

(21) Appl. No.: 16/779,846

(22) Filed: Feb. 3, 2020

(65) Prior Publication Data

US 2020/0170246 A1 Jun. 4, 2020

Related U.S. Application Data

(63) Continuation of application No. PCT/US2018/045555, filed on Aug. 7, 2018.

(60) Provisional application No. 62/544,113, filed on Aug. 11, 2017.

(51) Int. Cl.
*A01N 31/08* (2006.01)
*A01N 65/08* (2009.01)
*A01N 31/16* (2006.01)

(52) U.S. Cl.
CPC ............ *A01N 31/08* (2013.01); *A01N 65/08* (2013.01)

(58) Field of Classification Search
CPC ......... A01N 31/08; A01N 65/08; A01N 31/16
See application file for complete search history.

(56) References Cited

U.S. PATENT DOCUMENTS

| 2008/0182751 A1 | 7/2008 | Morra et al. |
| 2010/0062439 A1 | 3/2010 | Helder et al. |
| 2013/0261069 A1 | 10/2013 | Dutton et al. |
| 2015/0289516 A1 | 10/2015 | Margolis et al. |

FOREIGN PATENT DOCUMENTS

WO  WO 2018/094075  5/2018

OTHER PUBLICATIONS

Sobczak et al, Characterization of Susceptibility and Resistance Responses to Potato Cyst Nematode (*Globodera* spp.) Infection of Tomato Lines in the Absence and Presence, 2005, MPMI, No. 2, pp. 158-168. (Year: 2005).*

Dias et al, Solanum sisymbriifolium—a new approach for the management of plant-parasitic nematodes, 2012, Eur J Plant Pathol, 133, pp. 171-179. (Year: 2012).*

(Continued)

*Primary Examiner* — Trevor Love
(74) *Attorney, Agent, or Firm* — Klarquist Sparkman, LLP

(57) ABSTRACT

Disclosed herein is a method for controlling nematode populations, particularly soil nematode populations. Certain embodiments comprise applying 4-hydroxybenzylalcohol, *Sinapis alba* plant extract, *Sinapis alba* seed meal, or a combination thereof, to soil, optionally in the presence of a trap crop. A hatching factor and/or a nematicide may also be applied to the soil, either substantially simultaneously with the 4-hydroxybenzyl alcohol, *Sinapis alba* plant extract, *Sinapis alba* seed meal, or combination thereof, or sequentially in any order. Certain embodiments concern applying 4-hydroxybenzyl alcohol to soil that contains potato cyst nematode eggs. The 4-hydroxybenzyl alcohol may be obtained by an aqueous extraction of *Sinapis alba* plant material.

18 Claims, 7 Drawing Sheets

(56) References Cited

OTHER PUBLICATIONS

Devine et al., "Effects of hatching factors on potato cyst nematode hatch and in-egg mortality in soil and in vitro," *Nematology* 3(1):65-74, 2001.
International Search Report dated Oct. 23, 2018 from International Application No. PCT/US2018/045555.
Koch et al., "Trap Crops: A Promising Alternative for Sugar Beet Nematode Control," University of Wyoming, pp. 1-4, Jul. 1999.
Meyer et al., "Mustard Seed Meal for Management of Root-knot Nematode and Weeds in Tomato Production," *HortTechnology* 25:192-202, Apr. 2015.
Brown et al., "Control of Soil-Borne Plant Pests Using Glucosinolate-Containing Plants," *Advances in Agronomy* 61:167-231, 1997.

\* cited by examiner

FIG. 12

*G. pallida* Hatch After 2-week Treatment of *S. alba* and Derivative Compounds

- 139 umol/g HBA + PRD: 25.40
- S. alba Meal + PRD: 18.98
- Bare Soil + PRD: 13.68
- S. alba Meal + Soil Extract: 2.29
- Bare Soil + Soil Extract: 5.79

FIG. 13

*G. pallida* J2 Emergence After Direct Treatment of HBA with PRD

- HBA 8 umol/mL + PRD
- HBA 4 umol/mL + PRD
- HBA 2 umol/mL + PRD
- HBA 1 umol/mL + PRD
- PRD Only
- Soil Extract Only

NEMATODE CONTROL

CROSS REFERENCE TO RELATED APPLICATION

This is a continuation of International Application No. PCT/US2018/045555, filed Aug. 7, 2018, which was published in English under PCT Article 21(2), which in turn claims the benefit of the earlier filing date of U.S. provisional patent application No. 62/544,113, filed Aug. 11, 2017, both of which are incorporated herein by reference in their entireties.

ACKNOWLEDGMENT OF GOVERNMENT SUPPORT

This invention was made with government support under grant No. 15-8516-1590-CA awarded by United States Department of Agriculture Animal and Plant Health Inspection Service. The government has certain rights in the invention.

FIELD

Disclosed embodiments concern a method for using of 4-hydroxybenzyl alcohol, *Sinapis alba* plant extract, *Sinapis alba* seed meal, or a combination thereof, for nematode control.

BACKGROUND

Nematodes are microscopic worms that occur worldwide in most environments. While many species are beneficial to agriculture, some species are parasitic to plants, including certain cyst and root-knot nematodes. Cyst nematodes form egg-bearing cysts, typically on plant roots. When the eggs hatch, the nematode invades the root, damaging the plant and reducing the yield of many agricultural crops. Root-knot nematode larvae infect plant roots causing the development of root-knot galls that can drain the plant's nutrients. If untreated, cysts and eggs may remain viable in the soil for years, waiting for a suitable host crop to be planted, and/or suitable environmental conditions, such as temperature and/or moisture, to occur.

Several commercially important crops that can be impacted by cyst nematode infections, including potatoes, soybeans, cereals, such as wheat, and sugar beet.

Nematicides are available to control nematode infections. Those known nematicides, typically are more effective on live worms, and less effective on cysts and eggs. However, most nematicides are synthetic chemicals, such as halogenated fumigants, carbamates, or organophosphates, that have to be applied to the soil to effectively control the nematode population. Many of these synthetic nematicides are highly toxic and many of them are potential environmental pollutants. The use of such synthetic chemicals is incompatible with organic farming, and the few alternatives available are relatively ineffective.

SUMMARY

Disclosed herein is a method for nematode control, comprising applying 4-hydroxybenzyl alcohol, *Sinapis alba* plant extract, *Sinapis alba* seed meal, or a combination thereof, to soil having, or at risk of having, nematode eggs. The 4-hydroxybenzyl alcohol, *Sinapis alba* plant extract, *Sinapis alba* seed meal, or combination thereof, is applied in an amount and manner sufficient to effect nematode egg hatch. The 4-hydroxybenzyl alcohol, *Sinapis alba* plant extract, *Sinapis alba* seed meal, or combination thereof, may be applied in the presence of a trap crop. The trap crop may be any crop suitable for nematode control, such as a solanaceous crop, a cruciferous crop, a grain crop, a tuber-forming, non-*Solanum* species, or a combination thereof. In some embodiments, the trap crop is a potato crop, tomato crop, tobacco crop, mustard crop, radish crop, or a combination thereof. The trap crop may be *Solanum sysimbriifolium, Solanum aethiopicum, Solanum quitoense, Solanum lycopersicoides, Solanum cercifolium, Brassica juncea, Sinapis alba, Raphanus sativus, Brassica napus, Chenopodium quinoa, Lupinus mutabilius, Ullucus tuberosum*, or a combination thereof. In any embodiments, the 4-hydroxybenzyl alcohol, *Sinapis alba* plant extract, *Sinapis alba* seed meal, or combination thereof, may be applied to the soil a distance from the trap crop suitable to effect nematode control, such as from greater than zero to 2 feet from the trap crop.

Additionally, or alternatively, the method may comprise applying a hatching factor to the soil optionally obtained from one or more trap crops, such as a trap crop disclosed herein. The hatching factor may comprise a potato hatching factor, a potato root diffusate, a tomato root diffusate, a soybean root diffusate, a sugar beet root diffusate, or a combination thereof. The hatching factor may be applied substantially simultaneously with the 4-hydroxybenzyl alcohol, *Sinapis alba* plant extract, *Sinapis alba* seed meal, or a combination thereof. Alternatively, the hatching factor may be applied from greater than zero to 6 months or more after application of the 4-hydroxybenzyl alcohol, *Sinapis alba* plant extract, *Sinapis alba* seed meal, or a combination thereof.

Additionally, or alternatively, the method may comprise applying a nematicide to the soil. The nematicide may be a carbamate, organophosphate, or a fumigant. The nematicide may be applied substantially simultaneously with the 4-hydroxybenzyl alcohol, *Sinapis alba* plant extract, *Sinapis alba* seed meal, or a combination thereof. Alternatively, the nematicide may be applied from greater than zero to 6 months or more after application of the 4-hydroxybenzyl alcohol, *Sinapis alba* plant extract, *Sinapis alba* seed meal, or a combination thereof.

In any embodiments, the nematode eggs may be encysted eggs. In certain embodiments, the nematode egg is a potato nematode egg, and may be the egg of a potato nematode selected from *Globodera achilleae, Globodera artemisiae, Globodera chaubattia, Globodera ellingtonae, Globodera hypolysi, Globodera leptonepia, Globodera millefolii, Globodera mirabilis, Globodera pallida, Globodera pseudorostochiensis, Globodera rostochiensis, Globodera tabacum, Globodera zelandica*, or a combination thereof. The nematode egg may be a soy nematode egg, such as the egg of *Heterodera glycines*. Alternatively, the nematode egg may be a sugar beet nematode egg, such as a *Heterodera schachtii* egg. In other embodiments, the nematode egg is an egg of a nematode selected from a *Globodera* species, *Heterodera* species, *Meloidogyne* species, *Pratylenchus* species, *Xiphenama* species, or a combination thereof.

The method may comprise applying the 4-hydroxybenzyl alcohol, *Sinapis alba* plant extract, *Sinapis alba* seed meal, or a combination thereof to the soil in an amount suitable to facilitate nematode control in the soil in combination with a trap crop, nematicide, hatching factor, or combination thereof. *Sinapis alba* seed meal may be administered in an amount of from 500 lbs meal/acre to 4,000 lbs or more meal/acre, such as from 1,000 lbs meal/acre to 3,000 lbs meal/acre, from 1,500 lbs meal/acre to 2,500 lbs meal/acre, or about 2,000 lbs meal/acre. *Sinapis alba* plant extract may be administered in an amount of from 50 lbs/acre or less to 1,000 lbs or more extract/acre, such as from 100 lbs extract/acre to 1,000 lbs extract/acre, from 200 lbs extract/acre to 800 lbs extract/acre, from 350 lbs extract/acre to 650 lbs extract/acre, or about 500 lbs extract/acre. 4-hydroxybenzyl alcohol may be applied to the soil in an amount of from greater than zero to 100 lbs or more per acre, such as from 1 lbs/acre to 100 lbs/acre, from 5 lbs/acre to 75 lbs/acre, from 20 lbs/acre to 50 lbs/acre, or from 25 lbs/acre to 40 lbs/acre. In some embodiments, about 30 lbs/acre 4-hydroxybenzyl alcohol is applied to the soil.

In particular embodiments, the method comprises applying 4-hydroxybenzyl alcohol to the soil. The 4-hydroxybenzyl alcohol may be applied in the presence of a trap crop. Additionally, or alternatively, method may comprise applying a hatching factor to the soil, applying a nematicide to the soil, or applying both a nematicide and a hatching factor to the soil, substantially simultaneously, or sequentially in any order.

In any embodiments, the method may comprise applying a formulation comprising a concentration of 4-hydroxybenzyl alcohol of from greater than zero to 6,000 µmol/mL, such as from 100 µmol/mL to 1,000 µmol/mL.

The foregoing and other objects, features, and advantages of the invention will become more apparent from the following detailed description, which proceeds with reference to the accompanying figures.

BRIEF DESCRIPTION OF THE DRAWINGS

FIG. 12 is a graph of *Globodera pallida* hatch (%) versus treatment type, illustrating the percent *Globodera pallida* hatch after a 2-week exposure to *Sinapis alba* seed meal, its hydrolysis product 4-hydroxybenzyl alcohol (HBA), or to a non-treated bare soil control in potato root diffusate (PRD) or in soil extract.

FIG. 13 is a graph of *Globodera pallida* emergence (%) versus treatment type, illustrating the percent hatch of *Globodera pallida* eggs after a 2-week exposure to 5 rates of 4-hydroxybenzyl alcohol (HBA) (0 µmol/ml, 1 µmol/ml, 2 µmol/ml, 4 µmol/ml, 8 µmol/m1) in either potato root diffusate (PRD) or soil extract.

DETAILED DESCRIPTION

I. Definitions

Figure 1:
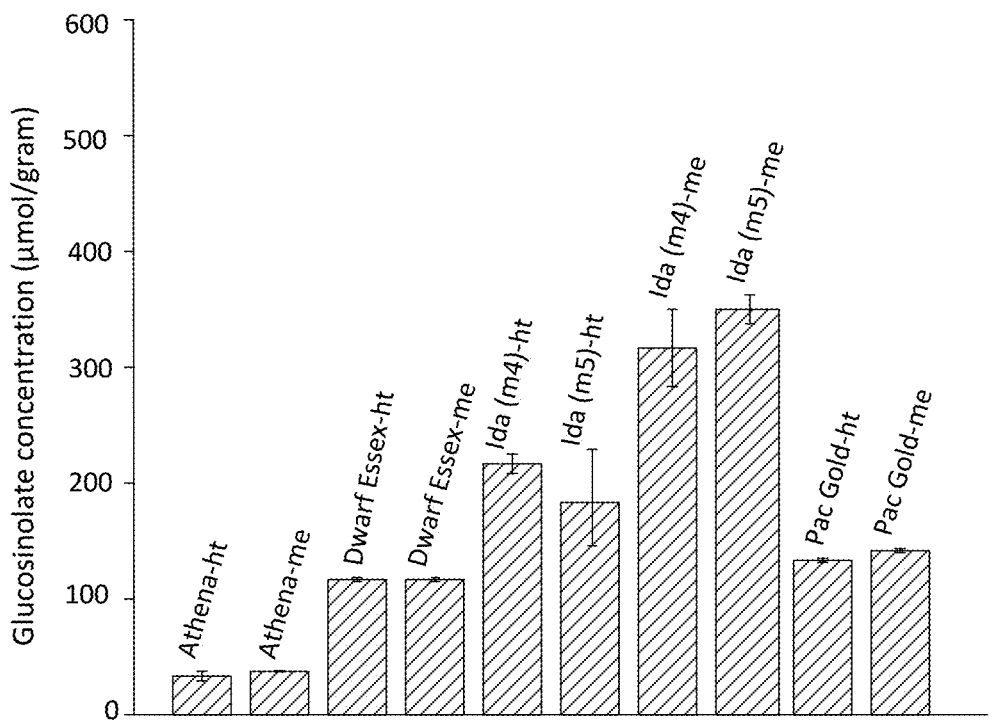
FIG. 1 is a graph of glucosinolate concentrations (µmol glucosinolates per gram seed meal determined without using a response factor) for various plant materials as determined using hot water (ht) and methanol (me) extractions. Athena and Dwarf Essex are *B. napus* species, Ida is a *S. alba* species, and Pac Gold is a *B. juncea* species. Ida samples m4 and m5 represent two different *S. alba* meal samples.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Cyst: A casing around the eggs of a cyst nematode. Typically the cyst is formed by the body of the female, which instead of laying the eggs, keeps them in her body. After death, the body becomes hard or tanned and protects the eggs from adverse environmental conditions. Eggs in cysts can remain viable for several years. Approximately 20 to 60 percent of the eggs hatch annually under suitable temperature and moisture conditions.

Gall: A swelling growth on the external tissues of plants. Root-knot nematodes typically cause galls to appear on the roots of susceptible plants.

II. Overview

Nematodes are microscopic worms that are found in almost every environment in the world. While many nematode species are not harmful, and some are even beneficial, certain nematode species attach and feed on plants including crops species. Such attacks can cause substantial crop yield reductions and associated financial losses for farmers. Disclosed herein is a method for nematode control, comprising applying 4-hydroxybenzyl alcohol to soil, particularly soil that contains, or is at risk of containing, nematode eggs. The 4-hydroxybenzyl alcohol may be applied to soil in the presence of a trap crop, and/or the method may further comprise applying a hatching factor and/or a nematicide to the soil.

III. 4-Hydroxybenzyl alcohol

4-Hydroxybenzyl Alcohol has a Structure

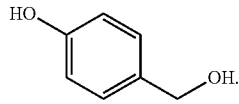

4-Hydroxybenzyl alcohol can be made synthetically, or it can be obtained from plant material, such as *Sinapis alba*. In some embodiments, 4-hydroxybenzyl alcohol is obtained from an aqueous extraction of *Sinapis alba* plant material, such as seed meal. 4-Hydroxybenzyl alcohol is produced by hydrolysis of the primary glucosinolate in *Sinapis alba*. The hydrolysis typically is enzymatic hydrolysis that produces 4-hydroxybenzyl isothiocyanate that subsequently decomposes in aqueous conditions to form 4-hydroxybenzyl alcohol.

Glucosinolates, found in dicotyledonous plants, are a class of organic anions usually isolated as potassium or sodium salts, but occasionally in other forms. For example, p-hydroxybenzyl glucosinolate is isolated as a salt complex with sinapine, an organic cation derived from choline. Features common to the class are a ß-D-thioglucose moiety, a sulfate attached through a C=N bond (sulfonated oxime), and a side group (designated R) that distinguishes one glucosinolate from another. A general formula for glucosinolates is provided below.

Glucosinolate General Formula

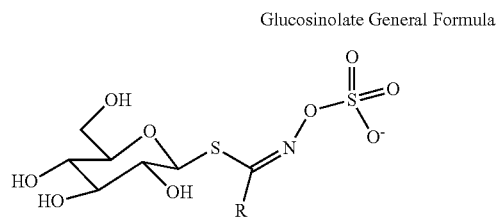

More than 130 different R groups, and thus glucosinolates, have been identified or inferred from degradative products.

Glucosinolate types in plant species are highly variable. For example, the main glucosinolate in radish seed (*Raphanus sativus*) is 4-methylsulphinyl-3-butenyl glucosinolate, while mustard seed (*Brassica juncea*) is dominated by 2-propenyl glucosinolate. Cabbage seed (*Brassica oleracea*) contains mainly 2-propenyl and 2-hydroxy-3-butenyl glucosinolate. Rapeseed (*Brassica napus*) contains 4 major glucosinolates: 2-hydroxy-3-butenyl, 3-butenyl, 4-pentenyl, and 2-hydroxy-4-pentenyl glucosinolates. Similar differences in glucosinolate types are observed when comparing vegetative plant parts.

*Brassica* and *Sinapis* species, and many other members of the Brassicaceae plant family, produce glucosinolate compounds, which are secondary metabolites. Thus, disclosed embodiments of the present application may also comprise determining plants that produce glucosinolates in amounts effective for use as a biopesticide, such as a nematicide, and/or that can enhance nematode hatch when used in combination with a hatching factor. Glucosinolates are compounds that occur in agronomically important crops and may represent a viable source of allelochemic control for various soil-borne plant pests. Glucosinolates can be extracted from plant material using aqueous extractions, using polar organic compounds, such as lower alkyl alcohols as the solvent, or by using aqueous mixtures of polar organic compounds to perform extractions, as illustrated by FIG. 1.

Glucosinolates are normally stored within plant tissues. Toxicity is not attributed to intact glucosinolates. Upon tissue damage, plant enzymes trigger glucosinolate hydrolysis to several compounds including nitriles, isothiocyanates (ITCs, —N=C=S), organic cyanides, oxazolidinethiones (OZTs), and ionic thiocyanate (SCN⁻), that are released upon enzymatic degradation in the presence of water as indicated in Scheme 1. Degradation also occurs thermally or by acid hydrolysis. Toxicity is generally attributed to these bioactive products.

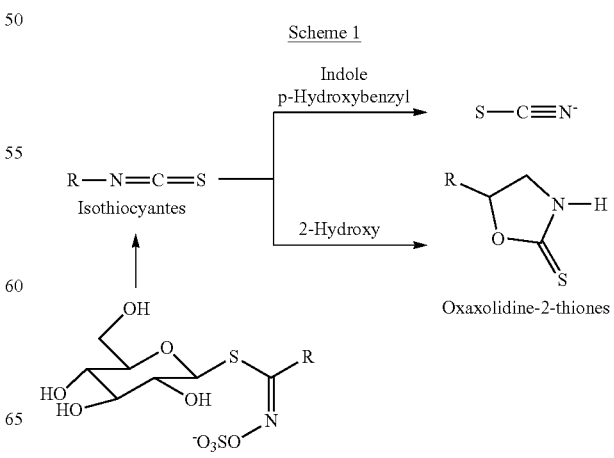

Scheme 1

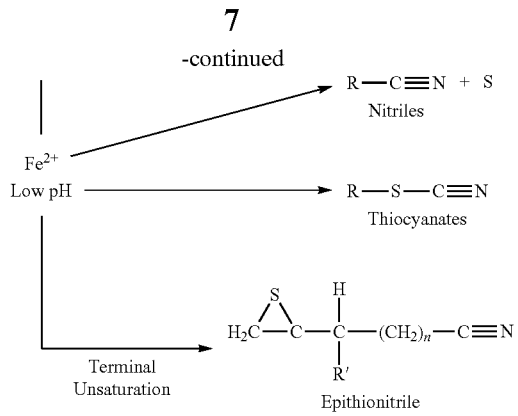

Myrosinase (thioglucoside glucohydrolase, EC 3.2.3.1) is not properly identified as a single enzyme, but rather as a family or group of similar-acting enzymes. Multiple forms of the enzymes exist, both among species and within a single plant, and all perform a similar function. Although their genetic sequences are similar to other ß-glycosidases, myrosinases are fairly specific toward glucosinolates. These enzymes cleave the sulfur-glucose bond regardless of either the enzyme or substrate source. However, the particular enzyme and glucosinolate substrate influence reaction kinetics.

Myrosinase and glucosinolates are separated from each other in intact plant tissues. Glucosinolates are probably contained in vacuoles of various types of cells. In contrast, myrosinase is contained only within structures called myrosin grains, which are specialized myrosin cells that are distributed among other cells of the plant tissue. In cold-pressed meal, myrosinase and glucosinolates are no longer physically separated, and myrosinase activity is preserved. Thus, adding water immediately results in the production of the hydrolysis products, including isothiocyanate, without the need for additional tissue maceration.

Nitrile character is common to four additional products. Forming a nitrile (R—C≡N, also known as an organic cyanide), which does not require rearrangement, involves sulfur loss from the molecule. Nitrile formation is favored over ITC at low pH, and even occurs in some crucifers at a pH where ITC is normally the dominant product. The presence of $Fe^{2+}$ or thiol compounds increases the likelihood of nitrile formation and decreases the proportion of $SCN^-$ production.

Epithionitrile formation requires the same conditions as for nitriles, plus terminal unsaturation of the R-group and the presence of an epithiospecifier protein. The epithiospecifier protein possesses a rare property in that it is an enzyme cofactor that allosterically directs an enzyme to yield a different product. Thiocyanate (R—S—C≡N) is sometimes produced, particularly in members of the *Alyssum, Coronopus, Lepidium,* and *Thlaspi* families. Factors controlling organic thiocyanate formation are not well understood.

Figure 2:
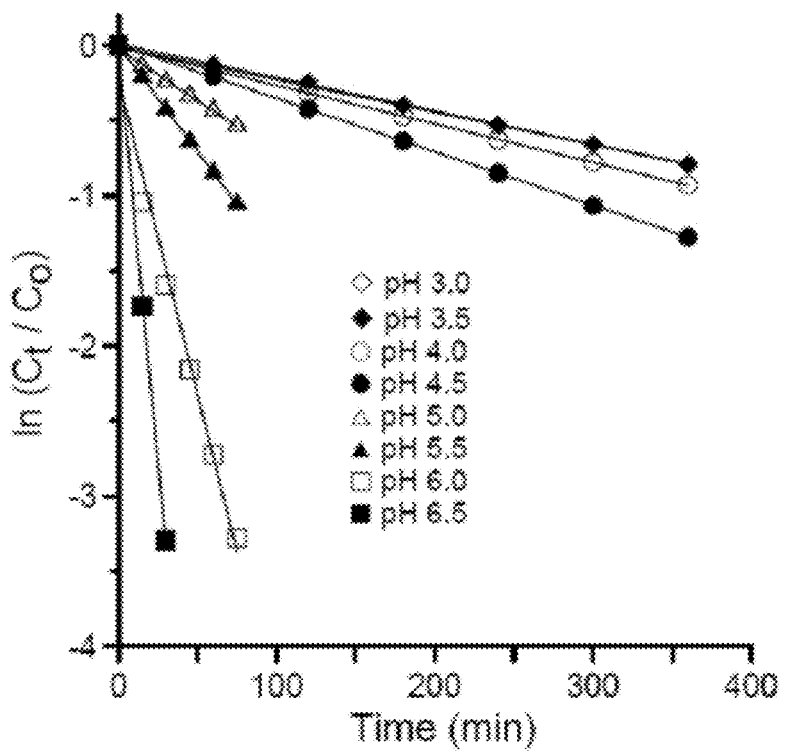
FIG. 2 provides first-order plots for the disappearance of 4-hydroxybenzyl isothiocyanate incubated in buffered aqueous solutions with pH values ranging from 3.0 to 6.5, where plots for pH 3.0 and 3.5 are superimposed on each other in the graph.

$SCN^-$ production from glucosinolates is controlled by the presence of specific R-groups. Evidence suggests the anion is a resonance hybrid with greater charge on the S; however, charge can be localized on either the sulfur ($^-$S—C≡N) or the nitrogen (S=C=N$^-$), depending on the environment. Indole and 4-hydroxybenzyl glucosinolates yield $SCN^-$ that is thought to arise from a highly unstable ITC intermediate. $SCN^-$ is formed from indole glucosinolates over a wide pH range, whereas 4-hydroxybenzyl glucosinolates typically yield $SCN^-$ only at a more basic pH. As discussed below, 4-hydroxybenzyl isothiocyanate is not stable even at pH values of 3.0, but instead forms 4-hydroxybenzyl alcohol. The half-life decreases with an increase in pH from 3.6 hours at pH 3.0 to less than 5 minutes at pH 7.0 (FIG. 2).

ITCs historically have been considered the 'normal' products of glucosinolate breakdown. They often are volatile with pungent flavors or odors. Some of the hydrolysis products, like ITCs, exhibit biocidal properties on insects, nematodes, fungi and/or weeds. ITC formation requires that the initial unstable aglucon intermediate undergo a Loessen rearrangement to the R—NCS configuration. Isothiocyanates are quite reactive, although less so than the related isocyanates (R—N=C=O). A few commercially available soil fumigants depend on the activity of methyl ITC either as the parent compound or as produced from precursors such as sodium N-methyldithiocarbamate or tetrahydro-3,5-dimethyl-2H-1,3,5-thiadiazine-2-thione. Because of known toxicities, ITCs are often considered likely candidates for pesticidal activity.

For *Sinapis alba*, the glucosinolate precursor to bioactive compounds is 4-hydroxybenzyl glucosinolate. Thus, the amount of this compound found in plants provides another basis for determining plant material useful for practicing embodiments of the disclosed invention. The structural formula for 4-hydroxybenzyl glucosinolate is provided below.

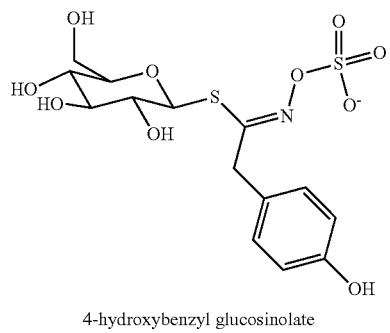 [SMILES: O=S(=O)([O-])O/N=C(/Cc1ccc(O)cc1)SC1OC(CO)C(O)C(O)C1O]

4-hydroxybenzyl glucosinolate

A person of ordinary skill in the art will appreciate that certain derivatives of 4-hydroxybenzyl glucosinolate also potentially may be useful for practicing disclosed embodiments of the present invention. For example, naturally occurring or synthetic derivatives may include plural hydroxyl groups, as opposed to the single hydroxyl group present at the 4 position in 4-hydroxybenzyl glucosinolate. Such derivatives might have a chemical formula

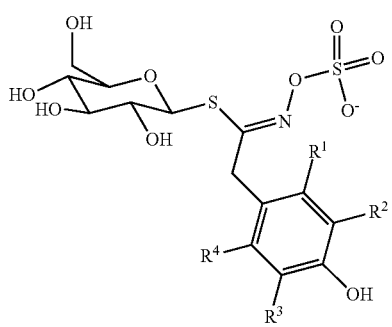

where one or more of $R^1$, $R^2$, $R^3$ and $R^4$ optionally are hydroxyl groups. It also will be appreciated that the hydroxyl groups present in 4-hydroxybenzyl glucosinolate, or derivatives thereof, may be present in some other form, such as a protected form, that produces the desired hydroxyl groups, such as by hydrolysis or enzymatic cleavage. Moreover, halide derivatives also may be useful. As a result, one or more of $R^1$, $R^2$, $R^3$ and $R^4$ optionally may be a halide.

Figure 3:
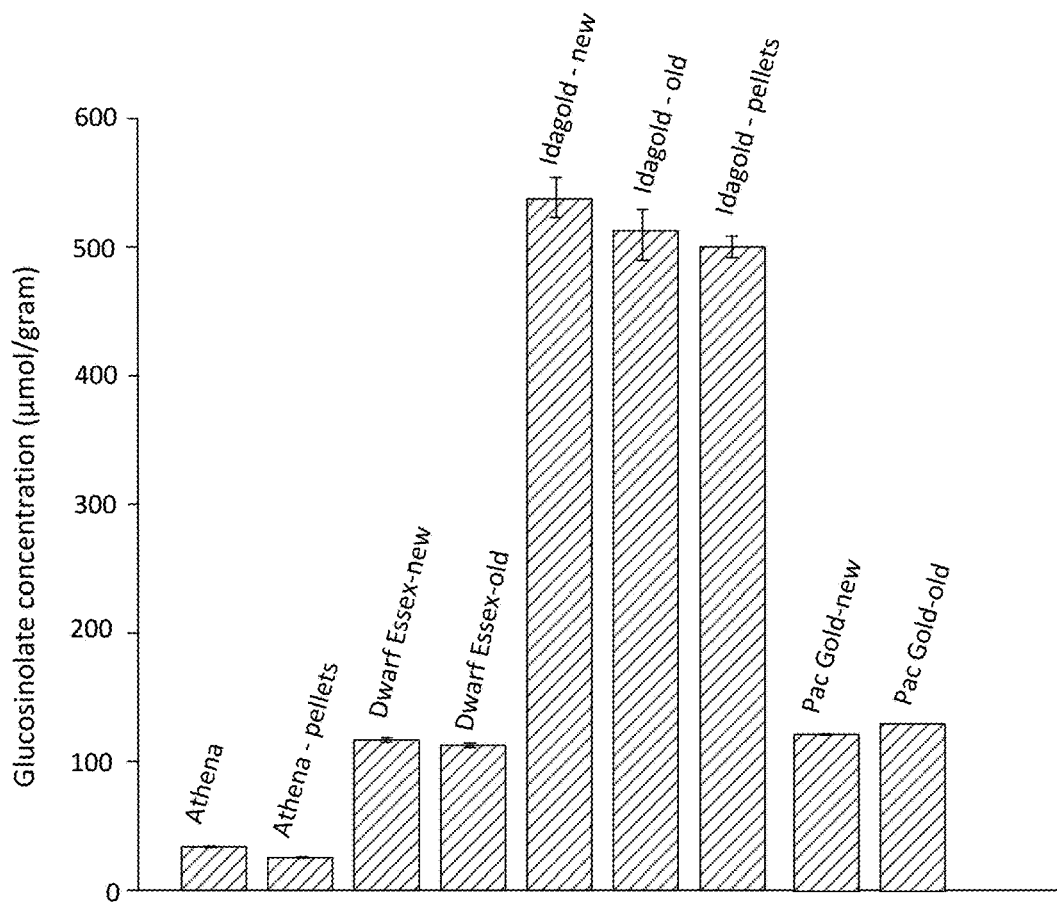
FIG. 3 is a graph of glucosinolate concentrations (µmol glucosinolates per gram seed meal determined without using a response factor) for various plant materials to compare total glucosinolates in stored (old) or freshly pressed (new) meals. Athena and Dwarf Essex are *B. napus* species, IdaGold is a *S. alba* species, and Pac Gold is a *B. juncea* species.

The concentrations of 4-hydroxybenzyl glucosinolate in plant material correspond to the amounts of ionic thiocyanate ($SCN^-$) produced by such materials. *Guidelines for Glucosinolate Analysis in Green Tissues for Biofumigation*, Agroindustria, Vol. 3, No. 3 (2004), which is incorporated herein by reference, provides standardized methodology used to quantitatively determine amounts of such bioactive compounds. This publication discusses modifications of the ISO 9167-1 method, initially set up for evaluating rapeseed seeds, with the objective of optimizing and standardizing glucosinolate analysis in fresh tissues (leaves, roots or stems) of Brassicaceae. Collection, storage and preparation of fresh samples suitable to be analyzed are important steps during which it is necessary to avoid glucosinolate hydrolysis by the endogenous myrosinase-catalyzed reaction. Differences in glucosinolate concentrations in stored, processed and fresh meal are illustrated by FIG. 3.

4-hydroxybenzyl glucosinolate concentrations may be determined using HPLC/MS. Additional information concerning determining glucosinolate concentrations is provided below in the working examples, using an internal standard, such as 4-methoxy benzyl glucosinolate. In summary, the concentration of the 4-hydroxybenzyl glucosinolate is measured, such as by determining the area under the appropriate HPLC peak. The concentration is multiplied by a response factor of 0.5 relative to 2-propenyl glucosinolate to determine the concentration of 4-hydroxybenzyl glucosinolate.

Certain embodiments concern plant material having effective amounts of 4-hydroxybenzyl glucosinolate. The glucosinolate concentration typically is determined after plant material has been cold pressed to remove a majority of the plant oil. Residual oil contents for cold pressed plants typically range from substantially 0% to about 15%, more typically from 7% to 12%. If solvent extraction is used for oil removal, oil contents may be less than 1%. Glucosinolate concentrations may vary within plants of a single species, and concentration fluctuations may occur within a particular plant. Additional environmental factors such as spacing, moisture regime, and nutrient availability also may affect concentration. Nevertheless, useful 4-hydroxybenzyl glucosinolate amounts are from about 10 µmol/gram to about 500 µmol/gram, typically from about 10 µmol/gram to about 400 µmol/gram, more typically from about 50 µmol/gram to about 250 µmol/gram, and even more typically from about 75 µmol/gram to about 210 µmol/gram.

Portions of plant material, leaves, stems, roots and seeds that have the highest concentration of glucosinolate commonly are used to practice embodiments of the disclosed process. Meal is preferably made from seeds; however it is possible to use any plant material containing glucosinolate to make the meal. For example, with reference to the exemplary *Sinapis alba* plant material, it has been found that *Sinapis alba* seeds contain the highest levels of 4-hydroxybenzyl glucosinolate. *Sinapis alba* is useful for making biodiesel. In one embodiment, biodiesel production crushes the seeds to liberate the oil, leaving the seed meal as a by-product. This by-product had limited use prior to development of the present invention. The seed meal now can be used to practice embodiments of the presently disclosed process.

In some embodiments, glucosinolates are extracted from the plant material or processed plant material, such as seed meal produced by the production of biodiesel. Extracting glucosinolates from the plant material or processed plant material has several advantages. It can significantly reduce the effects of batch-to-batch variability resulting from variability in plant growing conditions, processing and storage. Also, the cost and logistics of transportation, storage, and application of mustard meal are relatively high compared to extracts of the same. And the introduction of large amounts of meal to the soil may result in a large organic carbon load (mustard contains up to 80% of organic carbon by weight), which can create some adverse effects such as growth of undesirable microorganisms.

Additionally, the extracts are typically stable in storage for at least three months at 25° C., and up to a year or more at −4° C. The extracts are typically not light sensitive, are thermally stable up to 120° C., and do not promote mold growth. In some embodiments, the extracts may have at least twice the concentration of active ingredients as mustard meal, such as up to three times, up to four times, or more than four times the concentration. The extracts can be prepared either as a powder, or as a solution in variety of active agent concentrations as required for different applications. The use of such solutions makes the extracts compatible with spray delivery systems.

The plant material or processed plant material is extracted using a solvent system suitable for extracting glucosinolates from the plant material. The solvent system used for the extraction may be a single solvent or mixture of solvents. Typically, an aqueous solvent system is used for the extraction, such as a solvent system comprising water and optionally an alkyl alcohol. The alkyl alcohols may comprise one or more $C_1$-$C_4$ alkyl alcohols, such as methanol, ethanol, propanol, isopropanol, n-butanol, isobutanol, sec-butanol or tert-butanol. In some embodiments, a single alcohol is used, but in other embodiments, two or more alcohols are used, such as a mixture of methanol and ethanol.

The solvent system may comprise from greater than 0% to 100% water and from less than 100% to 0% alcohol, such as 100% water, from 10% to 90% water and from 90% to 10% alcohol, or from 30% to 70% water and from 70% to 30% alcohol. In some embodiments, a ratio of water to alcohol is selected to inhibit or substantially prevent the glucosinolates from hydrolyzing during the extraction. In such embodiments, the percentage of alcohol in the solvent system is from 60% to less than 100%, such as from 65% to 95% or from 70% to 90%. In certain embodiments, seed meal, such as *B. juncea* seed meal, is extracted with an extraction solvent comprising, consisting essentially of, or consisting of from 60% to less than 100% alcohol and from greater than zero to 40% water, such as from 60% to 90% alcohol and from 10% to 40% water, from 60% to 80% alcohol and from 20% to 40% water, or from 65% to 75% alcohol and from 25% to 35% water, and in particular embodiments, the seed meal is extracted with an extraction solvent comprising, consisting essentially of, or consisting of about 70% alcohol and 30% water. In certain embodiments, the alcohol is ethanol.

Alternatively, the ratio of water-to-alcohol may be selected to promote hydrolysis of the glucosinolates to form 4-hydroxybenzyl alcohol during the extraction. In such embodiments, the solvent system typically comprises an excess of water. The solvent system may be 100% water, or it may comprise from 60% to 100% water and from 40% to 0% alcohol, such as from 70% to 90% water and from 30% to 10% alcohol. The extraction process may continue for a time period suitable to allow hydrolysis of the glucosinolates. In some embodiments, the extraction is performed for up to 5 days, such as up to 3 days, or from 2 to 3 days, to allow for extraction and hydrolysis to take place. The extraction may be performed at a temperature suitable to facilitate the extraction, such as from greater than zero to 80° C. or more, from 5° C. to 70° C., or from 20° C. to 40° C. During the extraction the pH optionally may be buffered, such as to maintain a pH of from 3.0 to 10.0, typically from 5.0 to 7.0. Examples of suitable buffers include, but are not limited to, phosphate, carbonate, bicarbonate buffers or combinations thereof.

Mustard meal can absorb water and swell up by up to about 400% or more. Accordingly, in most embodiments, the amount of mustard meal added to the aqueous solution is from greater than zero to 25% by weight, typically up to 20% by weight, to facilitate recovery of the liquid. In some embodiments, the amount of mustard meal is further limited to allow for reasonable recovery of the desired products, and may be 10% or less by weight, such as 7% or less or 4% or less.

The extracts may be filtered to remove any solid material, and then evaporated by any suitable technique known to a person of ordinary skill in the art, to remove the extraction solvent(s). Suitable techniques include, but are not limited to, rotary evaporation, optionally under vacuum, spray drying, belt drying, drum drying, freeze drying or any combination thereof. In certain embodiments, spray drying is preferred. Typically, the evaporation and/or drying will produce a solid extract, which may be in the form of a powder, such as a free-flowing powder.

Glucosinolates themselves are not biologically active and can be preserved in extracts for a substantial period of time, such as from greater than zero to 3 years or more. However, in the presence of water, glucosinolates are converted by the endogenous enzyme myrosinase (thioglucoside glucohydrolase, EC 3.2.1.147) into biologically active compounds. The major glucosinolate in *S. alba*, sinalbin, is hydrolyzed to an unstable isothiocyanate that non-enzymatically produces SCN$^-$, a phytotoxic compound, and 4-hydroxybenzyl alcohol (4-hydroxybenzyl alcohol) (Scheme 2). The major glucosinolate in *B. juncea*, sinigrin, is hydrolyzed to produce a volatile, bioactive 2-propenyl isothiocyanate, that may be used as a nematicide.

Scheme 2

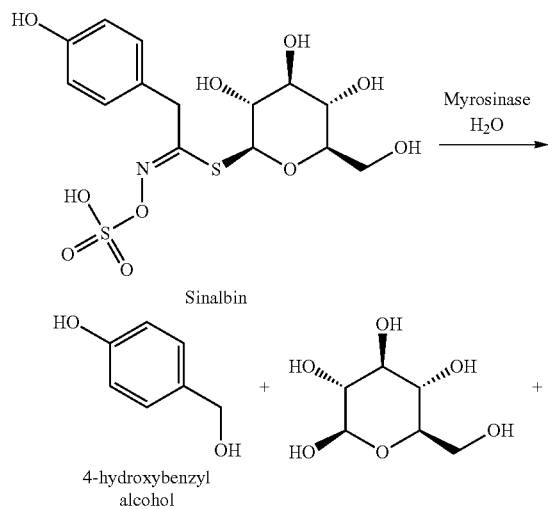

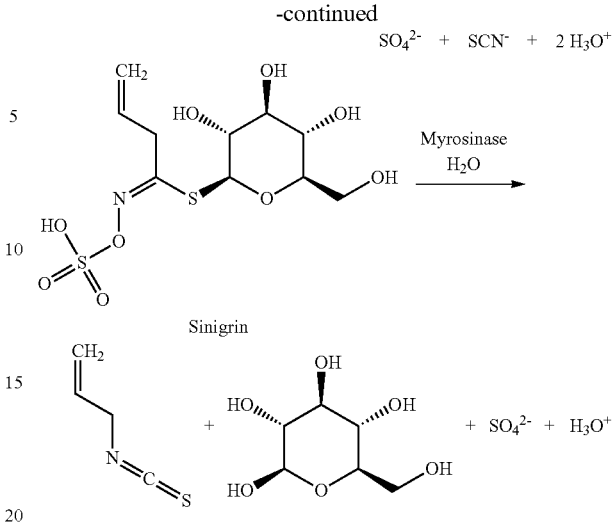

Myrosinase is present in mustard meal, such as *S. alba* and *B. juncea* meal. Thus, mustard meal may be added to an aqueous solution or to a powdered extract of glucosinolates to aid hydrolysis. The aqueous solution or powdered extract also may comprise a buffer, such as a phosphate buffer, carbonate buffer, bicarbonate buffer, or a combination thereof, to maintain a pH preferable for the activity of the enzyme. In some embodiments, the pH is from about 5 to about 8, such as from 6 to 7.5.

Mustard extract hydrolysis can be performed prior to applying extract to the field. For example, a *S. alba* extract containing sinalbin can be hydrolyzed to yield 4-hydroxybenzyl alcohol. This solution can be applied through existing sprinkler or sprayer systems. Alternatively, mustard extract hydrolysis can be performed in situ by applying mustard extract to the field and hydrolyzing directly at the point of pest control. This approach is particularly useful for pest and nematode control when using the volatile, allyl isothiocyanate hydrolysis product of sinigrin from *B. juncea*.

IV. Nematodes

Nematodes are microscopic worms representing the most numerous multicellular animals on Earth. Some nematodes are plant parasites that attack agronomically important crops, causing decreases in yield and quality. Many plant parasitic nematodes require a specific host for successful reproduction. When a suitable host is not present, plant parasitic nematodes may remain dormant in soil as free-living eggs or eggs contained in a protective cyst, inactive but viable for years. The eggs may be stimulated to hatch by, for example, suitable environmental conditions, such as temperature and/or moisture levels; and/or a suitable plant host growing within a suitable distance. Certain eggs, particularly, encysted eggs, are stimulated to hatch by the release of chemicals from plants. These chemicals are referred to as hatching factors. Hatch factors can be released by either a host plant required for reproduction or a closely related non-host species. Hatching factors also can be added artificially to stimulate nematode hatch.

Certain soil characteristics may be beneficial for nematode growth. In some embodiments, the soil has a pH of from 4 or less to 9.5 or more, such as from 4 to 9.5, from 4.5 to 9, or from 4.5 to 8.5. The organic carbon concentration of the soil may be from greater than zero to 45% or more, such as from 0.1% to 45%, from 0.5% to 10%. The soil may comprise from 0 to 90% clay, from 0 to 90% silt, from 0 to 90% sand, or a combination thereof. In some embodiments, the soil comprises from 10% to 50% clay, from 10% to 50% silt, from 10% to 50% sand, or a combination thereof. Typically, soil temperatures above 4° C. and below 40° C. are preferred for hatch, more typically 10° C. to 25° C. Moisture content on a weight basis of 5% to 50% is preferred for hatch, more typically 10% to 20%.

Certain parasitic nematodes infect commercially important agricultural crops, including potato, soybean, cereal, such as wheat, and sugar beet crops. With respect to potatoes, the potato cyst nematode causes potato growth retardation, reducing yields by 60% or more in areas of high nematode populations.

The potato cyst nematode belongs to the genus *Globodera*, which includes about 12 species: *Globodera achilleae; Globodera artemisiae; Globodera chaubattia; Globodera ellingtonae; Globodera hypolysi; Globodera leptonepia; Globodera millefolii; Globodera mirabilis; Globodera pallida; Globodera pseudorostochiensis; Globodera rostochiensis; Globodera tabacum;* and *Globodera zelandica*. The nematodes live on the roots of plants of the Solanaceae family, which includes potatoes, tomatoes, eggplant, bell peppers, chili peppers, and tobacco. Nematodes of particular interest include *Globodera rostochiensis* on potato, and *Globodera tabacum* on tobacco.

The cyst nematode genus *Heterodera* includes at least 70 species. Among these are several species that are parasitic to commercial crops. For example, the soybean cyst nematode, *Heterodera glycines*, is the most serious soybean pathogen in the world. Since its discovery in the United States in 1954, it has spread to all states with significant soybean acreages. Severe yield loss caused by this pathogen is especially common in sandy soils. Soybean cyst nematode, however, is not restricted to any soil type and often causes significant soybean yield losses, which may go unnoticed, even in clay soils.

The sugar beet cyst nematode, *Heterodera schachtii*, can infect more than 200 plant species, including sugar beet, garden beet, table beet and canola, causing the infected plants to become pale yellow and wilt. The nematode can also survive on common weeds, such as wild mustard, pigweed, lambsquarters, shepherdspurse and purslane. Sugar beet cyst nematodes are found worldwide, and in the United States are present in almost all sugar beet-producing states. In heavily infected areas, losses due to sugar beet cyst nematode infections can be as much as $750 per acre.

Exemplary *Heterodera* species include, but are not limited to, *Heterodera carotae, Heterodera cruciferae, Heterodera humuli, Heterodera trifolii, Heterodera galeopsidis, Heterodera goettingiana, Heterodera betae, Heterodera sacchari, Heterodera cajani, Heterodera glycines,* or *Heterodera schachtii*. Other exemplary *Heterodera* species are sometimes grouped together as the "*Heterodera avenae* group." The *Heterodera* group may include *Heterodera avenae, Heterodera filipjevi, Heterodera arenaria, Heterodera aucklandica, Heterodera bifenestra, Heterodera hordecalis, Heterodera iri, Heterodera latipons, Heterodera mani, Heterodera pratensis, Heterodera spinicauda,* and/or *Heterodera turcomanica*. The *Heterodera avenae* group, or cereal cyst nematodes, invade and reproduce only in living roots of cereals and grasses, but not broadleaf plants. Damage from cereal nematode infections can be similar to symptoms associated with irregularities in soil depth, texture and/or pH, mineral and/or water availability, or other diseases. Accordingly, cereal nematode infections are routinely underestimated, but it is now estimated that nematode infections in the wheat crops of Idaho, Oregon and Washington states alone may reduce the wheat profitability by at least $3.4 million annually.

Other nematode species include, but are not limited to, root-knot nematodes, such as *Meloidogyne* spp. including *M. incognita, M. hapla, M. javanica, M. chitwoodi, M. arenaria, M. naasi, M. acronea, M. artiellia, M. brevicauda, M. coffeicola, M. exigua, M. gajuscus, M. enterolobii, M. partityla, M. thamesi* or *M. fallax*; lesion nematodes, such as *Pratylenchus* spp. including *Pratylenchus alleni, Pratylenchus brachyurus, Pratylenchus coffeae, Pratylenchus crenatus, Pratylenchus dulscus, Pratylenchus fallax, Pratylenchus flakkensis, Pratylenchus goodeyi, Pratylenchus hexincisus, Pratylenchus loosi, Pratylenchus minutus, Pratylenchus mulchandi, Pratylenchus musicola, Pratylenchus neglectus, Pratylenchus penetrans, Pratylenchus pratensis, Pratylenchus reniformia, Pratylenchus scribneri, Pratylenchus thornei, Pratylenchus vulnus,* or *Pratylenchus zeae*; and dagger nematodes, such as *Xiphenama* spp. including *X. americanum, X. diversicaudatum, X. index, X. italiae, X. bakeri, X. brevicolle, X. insigne, X. rivesi, X. vuittenezi, X. brasilense, X. hygrophylum, X. stenocephalum, X. elongatum, X. coxi, X. ingens, X. conurum, X. pachydermum, X. mammallatum, X. thorneanum, X. melitense, X. bacaniboia, X. surinamense, X. guirani, X. porosum, X. rotundatum, X. spinuterus, X. bergeri, X. douceti, X. nigeriense, X. attarodorum, X. clavicaudatum, X. elongatum, X. ifacolum, X. longidoroides, X. setariae, X. ifacolum, X. ebriense, X. pini, X. turcicum, X. basiria, X. marsupilami, X. malagasi, X. radicicola, X. longicaudatum, X. krugi, X. costaricense, X. filicaudatum,* or *X. pachtaicum*; or any combination thereof.

V. Hatching Factor

Hatching factors, or hatch factors, are chemicals released by plants that stimulate nematode eggs, including encysted eggs, to hatch. Hatching factors may be obtained from plant root diffusates or leachates, and a single diffusate may contain more than one hatching factor. For example, it has been shown that potato root leachate may contain at least ten hatching factors. The plants typically are the specific plants, or hosts, required for reproduction, or a closely related non-host plant species. Both potato and tomato root diffusate can be used as a hatching factor for potato cyst nematodes.

In some embodiments, a single hatching factor is administered, but in other embodiments, multiple hatching factors, such as 2, 3, 4, 5, 6, 7, 8, 9, 10 or more hatching factors, are administered either simultaneously or sequentially in any order. And/or a root diffusate from one or more plant species may be administered simultaneously or sequentially in any order, such as 1, 2, 3, 4, 5 or more different root diffusates, each comprising one or more hatching factors.

A. Trap Crops

Non-host species are often used to control plant parasitic nematodes by stimulating cyst hatching, thereby producing a nematode that dies without reproducing. These non-host species are referred to as trap crops. The potential threat to future host crops planted in that same field is thus reduced or eliminated. While the use of crop rotations with trap crops to break the growth cycle is one of the simplest and most cost-effective ways of controlling nematodes, hatch stimulation by the trap crop is typically incomplete and many encysted eggs remain viable.

Crucifer crops have a good reputation for rotating with cereals, sugar beets and potatoes. They have deep taproots, which break up plow pans, improve soil tilth and they are a good supplier of organic matter. Historically, mustards and radishes have been good nematode hosts, particularly for the beet cyst nematode. As a result, using mustards and radishes in a rotation can aggravate a nematode problem. The trap crops are special and unique varieties of white mustard and fodder radish. The roots of the trap crops produce chemicals that stimulate nematode cyst hatching in the soil. Once the nematodes hatch, they migrate to the growing roots of the trap crops. Once inside the roots, the nematodes start to feed. However, the trap crops have been bred to provide the nematode with inadequate nutrition to mature, and the nematode reproductive cycle is broken.

A further reduction of the number of cyst nematodes can be achieved by stimulating parasites that attack the nematodes. Decomposed trap crops can stimulate the development of saprophytic fungi that parasitize the eggs and nematodes within the cyst.

However, sophisticated plant breeding has now led to the development of new varieties that, although they attract them, are unsuitable hosts for cyst nematodes. Cultivation of these varieties can lead to a significant reduction in the population of cyst nematodes. For example, in Europe, trap crop use has increased sugar beet yields up to 33%, and increased sugar content 8%.

By inserting trap crops into the rotation, nematode levels have been reduced between 40 and 75%, if the crops are established at a favorable time for the nematodes to hatch (optimum temperature is 69/70° F.).

Exemplary trap crops include, but are not limited to, solanaceous crops such as potato, tomato, tobacco, and other *Solanum* spp. such as *S. sysimbriifolium, S. aethiopicum, S. quitoense, S. lycopersicoides, S. cercifolium*; cruciferous crops such as radishes and mustards including, but not limited to, *Brassica juncea, Sinapis alba, Raphanus sativus, Brassica napus*; grain crops such as *Chenopodium quinoa, Lupinus* mutabilius; tuber-forming, non-*Solanum* spp. such as *Ullucus tuberosum*; and any combination thereof. In certain embodiments, the trap crop is or comprises *Solanum sysimbriifolium*, particularly for potato cyst nematodes.

VI. Nematicides

Nematicides are pesticides, typically synthetic pesticides, that kill parasitic nematodes. Nematicides tend to be broad-spectrum toxicants that have properties, such as high volatility, that enable them to migrate through the soil. Certain nematicides are carbamates, such as 2-Methyl-2-(methylthio)propanal O—(N-methylcarbamoyl)oxime (Aldicarb), 2,2-Dimethyl-2,3-dihydro-1-benzofuran-7-yl methylcarbamate (carbofuran), Methyl 2-(dimethylamino)-N-[(methylcarbamoyl)oxy]-2-oxoethanimidothioate (oxamyl), 2-Methyl-2-(methylsulfonyl)propionaldehyde O-(methylcarbamoyl)oxime (aldoxycarb), methyl dithiocarbamate (metam sodium).

Other nematicides are organophosphates, such as O,O-Diethyl O-[4-(methylsulfinyl)phenyl]phosphorothioate (fensulfothion), 1-(ethoxy-propylsulfanylphosphoryl)sulfanylpropane (ethoprop), (RS)—N-[Ethoxy-(3-methyl-4-methylsulfanylphenoxy)phosphoryl]propan-2-amine (fenamiphos), (RS)—S-sec-Butyl-O-ethyl-2-oxo-1,3-thiazolidin-3-yl-phosphonothioat (fosthiazate), S,S-di-sec-butyl O-ethyl phosphorodithioate (cadusafos).

Other nematicides include, but are not limited to, *Streptomyces lydicus* WYEC 108, Dimethyl N, N'[thiobis[(methylimino)carbonyloxy]]bis[ethanimidothioate]/1-[(6-Chloro-3-pyridinyl)methyl]-N-nitro-2-imidazolidinimine] combination (Thiodicarb/imidacloprid, sold as Aeris™), *Bacillus firmus*, chitin+urea (ClandoSan), S-Methyl 1,2,3-benzothiadiazole-7-carbothioate (Acibenzolar-S-methyl), Azadirachtin (Dimethyl (2aR,3S,4S,R,S,7aS,8S,10R,10aS, 10bR)-10-(acetyloxy)-3,5-dihydroxy-4-[(1S,2S,6S,8S,9R, 11S)-2-hydroxy-11-methyl-5,7,10-trioxatetracyclo[6.3. 1.0$^{2,6}$.0$^{9,11}$]dodec-3-en-9-yl]-4-methyl-8-{[(2E)-2-methyl-but-2-enoyl]oxy}octahydro-1H-furo[3',4':4,4a]naphtho[1,8-bc]furan-5,10a(8H)-dicarboxylate), *Myrothecium verrucaria* fermentation products (DiTera), *Paecilomyces lilacinus*, (RS)—S-sec-butyl-O-ethyl-2-oxo-1,3-thiazolidin-3-ylphosphonothioate (fosthiazate), *Quillaja saponaria* saponins (Nema-Q), 5-chloro-2-(3,4,4-trifluorobut-3-ene-1-sulfonyl)-1,3-thiazole (Fluensulfone, Nimitz), ethylene dibromide, 1,2-dibromo-3-chloropropane, methyl bromide, chloropicrin, 3,5-Dimethyl-1,3,5-thiadiazinane-2-thione (dazomet), sodium tetrathiocarbonate, dimethyl dibromide, telone, or *Brassica juncea* extract, such as 2-propenyl isothiocyanate. A person of ordinary skill in the art will appreciate that these nematicides may be used singly, or in any combination, to effectively treat or control a nematode infection. In some embodiments, certain nematicides, for example, *Brassica juncea* extract, *Streptomyces lydicus* WYEC 108, *Bacillus firmus*, chitin+urea, or *Paecilomyces lilacinus* might be suitable for use in organic agriculture.

VII. Applications

4-Hydroxybenzyl alcohol can be used to control, such as reduce or prevent, nematode infections in commercial crops. The 4-hydroxybenzyl alcohol typically is used in combination with a nematicide, a hatching factor, a trap crop, or a combination thereof. When used with a nematicide and/or a hatching factor, the 4-hydroxybenzyl alcohol is administered prior to, or concurrently with, administration of a nematicide and/or hatching factor. In embodiments where the 4-hydroxybenzyl alcohol is used in combination with both a hatching factor and a nematicide, the 4-hydroxybenzyl alcohol may be administered prior to both the nematicide and hatching factor, concurrently with a hatching factor, concurrently with a nematicide, or concurrently with both a hatching factor and a nematicide. The nematicide is administered according to the manufacturers directions.

The 4-hydroxybenzyl alcohol may be applied to the soil in a concentration suitable to facilitate and/or enhance the effect of hatching factor(s) and/or nematicide(s). In some embodiments, the concentration of the 4-hydroxybenzyl alcohol is from greater than zero to 6,000 µmol/mL or more, such as from 20 µmol/mL to 2,000 µmol/mL, or from 100 µmol/mL to 1,000 µmol/mL. The 4-hydroxybenzyl alcohol can be applied to soil at any suitable level selected to control nematodes, from greater than zero to 100 lbs or more per acre, such as from 1 lb/acre to 100 lbs/acre, from 5 lbs/acre to 75 lbs/acre, from 20 lbs/acre to 50 lbs/acre, or from 25 lbs/acre to 40 lbs/acre. In some embodiments, about 30 lbs/acre 4-hydroxybenzyl alcohol is applied to the soil.

The 4-hydroxybenzyl alcohol may be particularly formulated for soil application. One disclosed formulation embodiment comprises a solution of 4-hydroxybenzyl alcohol in a suitable solvent, such as water or an aqueous buffer solution, such as a phosphate, carbonate or acetate buffer. Alternatively, or additionally, the formulation may comprise clays, emulsifiers, solvents, surfactants, and/or binding agents. The formulated product may be encapsulated to form a slow release material. The formulated product may be a sprayable material in the form of a wettable powder or water dispersible granule. It may be formulated as a liquid either to be applied directly to soil, applied through chemigation, or as a sprayable product in the form of a soluble concentrate, emulsifiable concentrate, microemulsion, oil dispersion, or microencapsulated particle. It may be formulated as a dry, spreadable granule on an inert or fertilizer carrier. It may be combined with antimicrobials or other biological inhibitors. Pigments or colorants may also be added.

In some embodiments, the 4-hydroxybenzyl alcohol is administered to soil containing nematode eggs and/or cysts in the presence of a trap crop, such as within a rooting area of a trap crop. The rooting area of the trap crop may be the area of soil around the plant into which the hating factor will be released by the roots. In some embodiments, the 4-hydroxybenzyl alcohol is administered to soil from greater than zero to 3 feet or more of the plant, such as from greater than zero to 2 feet. The trap crop may be a trap crop that produces a hatching factor, and in some embodiments, administration of the 4-hydroxybenzyl alcohol stimulates or enhances hatch of the nematodes, which are subsequently attracted to the trap crop. In some embodiments, the trap crop is selected to be unsuitable for nematode reproduction, thereby reducing the number of nematodes in the soil.

In some embodiments, the 4-hydroxybenzyl alcohol is administered in combination with a hatching factor. The 4-hydroxybenzyl alcohol may be administered substantially simultaneously with the hatching factor, or the hatching factor may be administered from greater than zero to 6 months or more after administration of the 4-hydroxybenzyl alcohol, such as from greater than zero to 6 months, from greater than zero to 4 months, from 1 day to 2 months, from 1 day to 1 month, from 1 day to 2 weeks, from 1 day to 1 week, or from 1 day to 5 days after 4-hydroxybenzyl alcohol administration. In some embodiments, the 4-hydroxybenzyl alcohol is administered in combination with a hatching factor to stimulate hatch of the nematode eggs and/or cysts when there is no crop suitable to facilitate reproduction of the nematodes. This process effectively reduces the nematode population in soil that is administered the combination. The 4-hydroxybenzyl alcohol/hatching factor may be administered to soil that has no crop planted, or it may be administered to soil that has a trap crop growing.

In some embodiments, the 4-hydroxybenzyl alcohol is administered in combination with a nematicide. The 4-hydroxybenzyl alcohol may be administered substantially simultaneously with the nematicide, or the nematicide may be administered from greater than zero to 6 months or more after administration of the 4-hydroxybenzyl alcohol, such as from greater than zero to 6 months, from greater than zero to 4 months, from 1 day to 2 months, from 1 day to 1 month, from 1 day to 2 weeks, from 1 day to 1 week, or from 1 day to 5 days after 4-hydroxybenzyl alcohol administration. Without being bound to a particular theory, administration of the 4-hydroxybenzyl alcohol may increase permeability of the cyst and/or egg outer membrane such that nematicide uptake is enhanced, thereby enhancing the effectiveness of the nematicide.

In some embodiments, the nematicide may be administered in combination with a 4-hydroxybenzyl alcohol/hatching factor combination as disclosed herein. The 4-hydroxybenzyl alcohol/hatching factor combination may stimulate hatch of the nematodes, which are then susceptible to nematicide administration. In such embodiments, the nematicide may be administered substantially simultaneously with the hatching factor, or it may be administered subsequently to administration of the hatching factor, such as from greater than zero to 6 months, from greater than zero to 4 months, from 1 day to 2 months, from 1 day to 1 month, from 1 day to 2 weeks, from 1 day to 1 week, or from 1 day to 5 days after hatching factor administration.

VIII. Examples

Example 1

Hydrolysis solution composition, time, and amount of mustard meal as a source of myrosinase were varied to determine the maximum production of allyl isothiocyanate and ionic thiocyanate from sinigrin, and sinalbin, respectively.

A. Materials and Methods

1. Materials

Mustard seeds of *S. alba* (IdaGold variety) and *B. juncea* (Pacific Gold) were obtained locally. Oil contents of seeds and meals were analyzed gravimetrically after extraction with hexane. A sinigrin standard and allyl isothiocyanate were purchased from Sigma-Aldrich (St. Louis, Mo., USA). Standard of sinalbin was isolated from *S. alba* in our laboratory. Acetonitrile, water, methanol, and other solvents were of HPLC or LC/MS grade. Solvents and all other chemicals (at least of analytical grade) were purchased from Sigma-Aldrich or ThermoFisher (Pittsburgh, Pa., USA).

2. Mustard Meal Crude Extract Preparation

Mustard meal was homogenized and ground to a fine powder. Seed meal was extracted with 73% (v/v) methanol at 1:20 v/v ratio using an end-to-end shaker at room temperature for 2 hours. Seed debris was separated by filtering, and filtrates were concentrated by rotary evaporation to remove most of the solvent. Concentrated extract was then freeze-dried to obtain a free flowing powder. The concentration of sinalbin in *S. alba* mustard extract was 777 μmole $g^{-1}$ extract and the concentration of sinigrin in *B. juncea* mustard extract was 555 μmole $g^{-1}$ extract.

3. Hydrolysis of Mustard Meal Crude Extract

Hydrolysis of mustard extracts was performed by adding corresponding mustard meal to mustard meal extract powder and then letting it hydrolyze in aqueous solution. Hydrolysis optimization was performed using 0.1 g of mustard meal with 0.05-0.3 of extract in 2.5 mL of aqueous solution. Hydrolysis media was modified with buffers at different pH and concentrations. Time of hydrolysis was optimized from 30 minutes to 48 hours under static conditions at room temperature.

4. Derivatization of Allyl Isothiocyanate

An aliquot (10-100 μL) of the hydrolysis mixture was diluted with methanol to 5 mL. Diluted solution (860 μL) was added to 2-mL autosample vial containing 860 μL of 100 mM potassium phosphate at pH 8.5. Then 280 μL of 35 mM 1,2-benzenedithiol/1% mercaptoethanol in methanol was added, the vial was capped and incubated for 1 hour at 65° C. After incubation, mixture was vortexed, centrifuged at 24000 rpm and analyzed by HPLC/UV.

5. HPLC/UV Analysis of Derivatized Allyl Isothiocyanate

Analysis of derivatized allyl isothiocyanate was performed using an Agilent 1200 Series HPLC system with a diode array detection (DAD) system on Agilent XDB C18 (1.8 μm, 4.6×50 mm) column (Agilent, Santa Clara, Calif., USA). Column was thermostated at 30° C. Isocratic elution was used with 90% acetonitrile in water. Flow rate was 0.6 mL/min. Spectra were recorded from 190 to 400 nm with 2 nm step. Injection volume was 5 μL. The runtime was 5 minutes with a derivatized allyl isothiocyanate elution time of 1.4 minutes. Derivatized allyl isothiocyanate was quantified at extracted wavelength channel of 350-360 nm. An external calibration curve was used for quantification.

6. Ion Chromatographic Analysis

Sinigrin, sinalbin, sulfate, and ionic thiocyanate in extracts were quantified by ion chromatography (IC). IC analysis was performed using a Dionex Ion Analyzer equipped with a GP40 gradient pump, ED40 electrochemical detector, and an AS40 autosampler. Dionex 4×210 mm Ion-Pac AS16 anion exchange column was used for separation. Sodium hydroxide (100 mM) was used as the mobile phase at flow rate of 0.9 mL/min. The detector stabilizer temperature was set at 30° C. with temperature compensation of 1.7% per ° C. Anion suppressor current was set to 300 mA. The injection volume was 20 μL.

7. Data Analysis

All experiments were performed at least in triplicate and are presented as means±one standard deviation. Significant differences among analyte concentrations detected by different methods of analysis were determined using one-way analysis of variance (ANOVA) with a $p<0.05$ level of significance. All analyses were performed using JMP software (version 10, SAS Institute Inc., Cary, N.C., USA).

B. Results and Discussions

1. Optimization of Hydrolysis pH and Buffering System

During sinalbin and sinigrin enzymatic hydrolysis, several hydrolysis products are released (Scheme 2). Sinigrin is hydrolyzed to equimolar amounts of allyl isothiocyanate, sulfate, glucose, and hydronium ion. Hydrolysis of sinalbin leads to equimolar amounts of 4-hydroxybenzyl alcohol, ionic thiocyanate, sulfate, glucose, and two moles of hydronium ion. The hydrolysis reaction is catalyzed by myrosinase enzyme, which is naturally present in mustard. To aid hydrolysis of mustard extracts, mustard meal was added as a source of myrosinase to the hydrolysis mixture. Mustard meal has relatively high mucilage content and can swell up to 400% in aqueous media. Thus the amount of meal added for hydrolysis of mustard extracts cannot exceed 20% by weight to allow for recovery of liquid and should not exceed 4% to allow for reasonable recovery of glucosinolates. When 0.1 g of mustard meal is added to 0.15 g of mustard extracts reconstituted in 2.5 mL of water, more than 84% of solution can be recovered after mustard meal swelling. If higher recoveries of glucosinolates are desired in the liquid phase, more diluted solutions of mustard extracts can be used.

Figure 4:
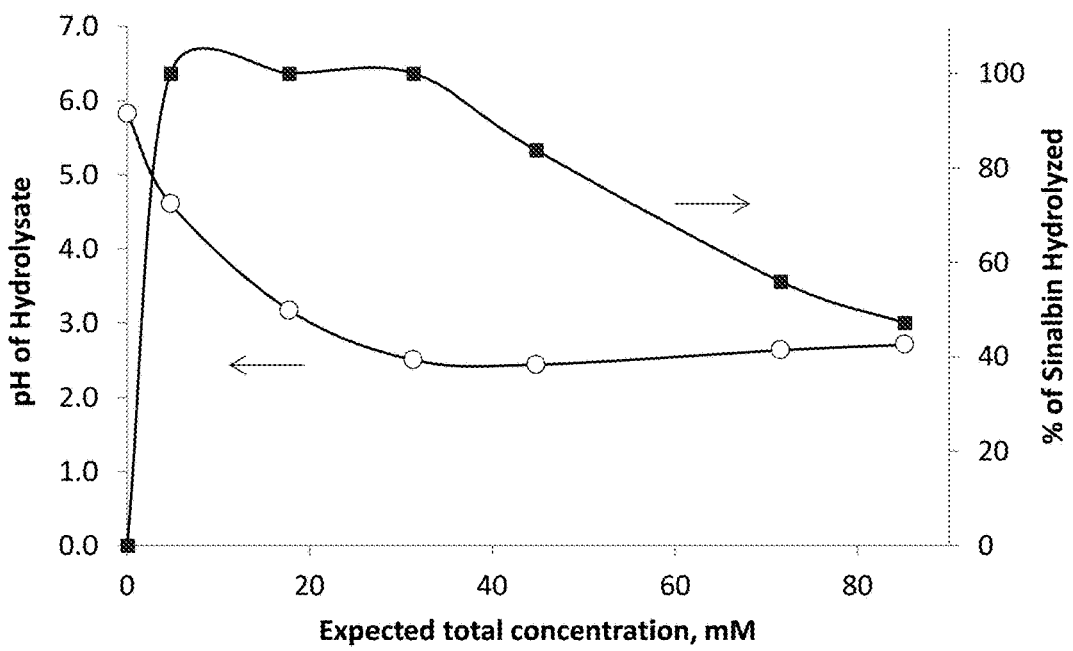
FIG. 4 is a plot of pH of hydrolysate and percentage of sinalbin hydrolyzed (%) versus expected total concentration (mM), illustrating the hydrolysis of *S. alba* mustard extract (0.05-0.3 g) in the presence of mustard meal (0.1 g) in 2.5 mL of water.
Figure 5:
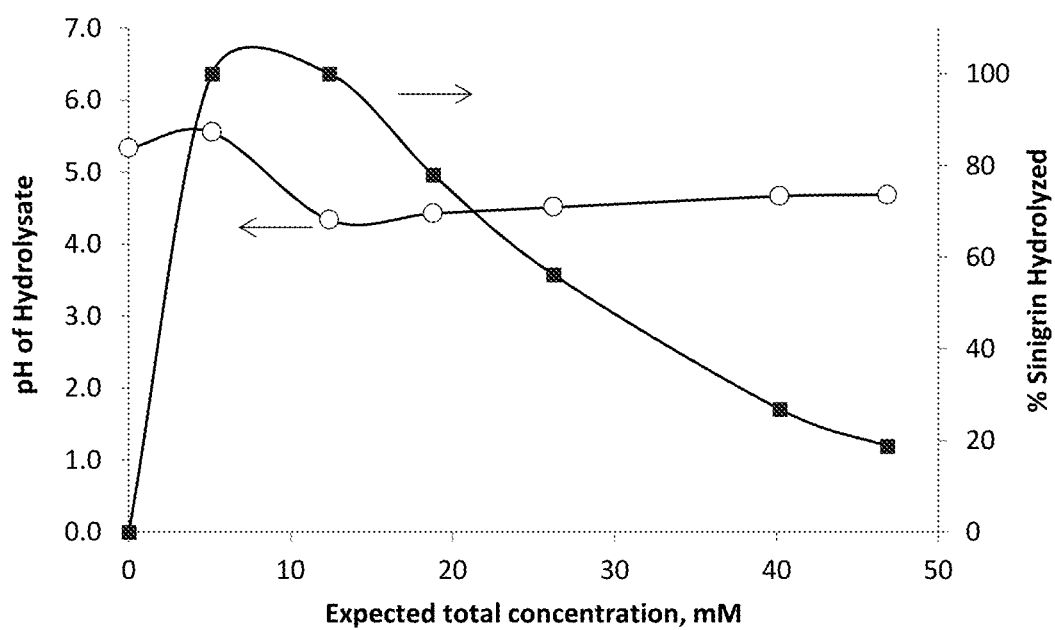
FIG. 5 is a plot of pH of hydrolysate and percentage (%) of sinalbin hydrolyzed versus expected total concentration (mM), illustrating the hydrolysis of *B. juncea* mustard extract (0.05-0.3 g) in the presence of mustard meal (0.1 g) in 2.5 mL of water.

For hydrolysis of endogenous glucosinolates the buffering capacity of mustard meal is sufficient to maintain pH even when endogenous glucosinolates are hydrolyzed in the presence of water and hydronium ion is released. However, unlike endogenous concentrations in mustard meal, concentration of glucosinolates in mustard extracts are significantly higher. The excess of glucosinolates relative to the meal leads to the change in pH that exceeds buffering capacity of the meal. Myrosinase has maximum of activity at pH of 5-7, while its activity is almost negligible at low pH. Indeed, when the amount of mustard extract was increased relative to the meal, the incomplete hydrolysis was observed with the increase of the total glucosinolate amount (FIGS. 4 and 5). Despite the increase of sinalbin extract added to the reaction mixture, the maximum concentration of $SCN^-$ produced was leveled out at 24 mM, which is about five times higher concentration that could be produced from the original mustard meal. For sinigrin, a similar trend was observed. The maximum concentration of allyl isothiocyanate produced was 14 mM even when up to 42 mM of sinigrin was added to the meal in the form of a mustard extract.

The incomplete hydrolysis of glucosinolates in mustard extracts is due to the decrease of reaction mixture pH (FIGS. 4 and 5). Upon hydrolysis of endogenous sinalbin, pH typically decreases by one unit from 5.8 to 4.6, at which myrosinase activity is still adequate. However, when mustard extracts are added to the meal, more than three-fold increase of the sinalbin concentrations resulted in pH decrease to one more unit pH. Sinalbin concentrations four times higher than the endogenous concentrations resulted in the pH of 2.5 and the myrosinase inactivation. Similarly, pH of sinigrin hydrolysis mixture is decrease to 4.6.

Figure 6:
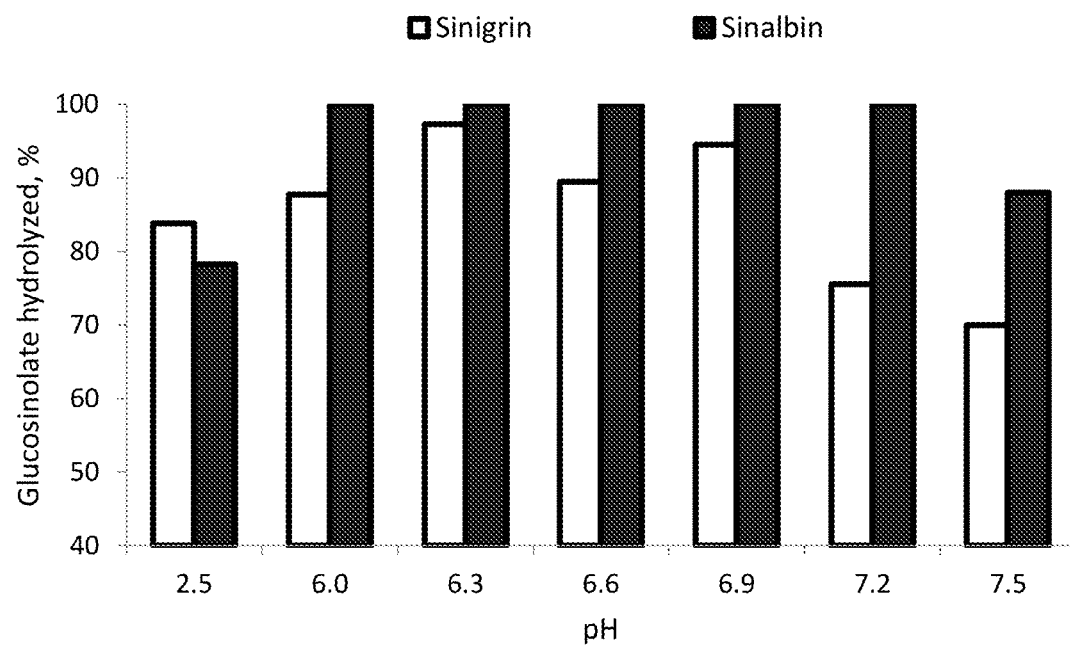
FIG. 6 is a plot of glucosinolate hydrolyzed (%) versus pH, illustrating the hydrolysis of *S. alba* and *B. juncea* mustard extracts (0.15 g) in the presence of mustard meal (0.1 g) in 2.5 mL of 200 mM phosphate buffer.

To prevent inactivation of myrosinase by increased acidity, a series of phosphate buffers in the pH range from 6.0 to 7.5 was used instead of water for glucosinolate hydrolysis (FIG. 6). When 200 mM phosphate buffer was used, complete hydrolysis of sinigrin and sinalbin was observed in pH range from 6.0 to 7.2, while some of glucosinolates were still unhydrolyzed when pH was increased to 7.5. The minimum concentration of phosphate buffer required for maintaining pH was investigated and accounted for 1.5-2 times of the expected concentration of glucosinolates in the extracts.

Other buffering agents (carbonate and bicarbonate) at the same concentration were equally efficient in maintaining hydrolysis mixture pH at 6.5 and providing complete hydrolysis of sinalbin and sinigrin. The use of carbonate for pH adjustment allows for the development of the glucosinolate extract pesticide which can be certified as organic and may make the final product less expensive.

2. Optimization of Hydrolysis Media Composition

To achieve quantitative conversion of intact glucosinolates to their biologically active products, hydrolysis media composition was further optimized. In the presence of buffer with mustard meal as a myrosinase source, sinigrin and sinalbin are completely hydrolyzed, however only 90% of corresponding biologically active hydrolysis products are produced.

Figure 7:
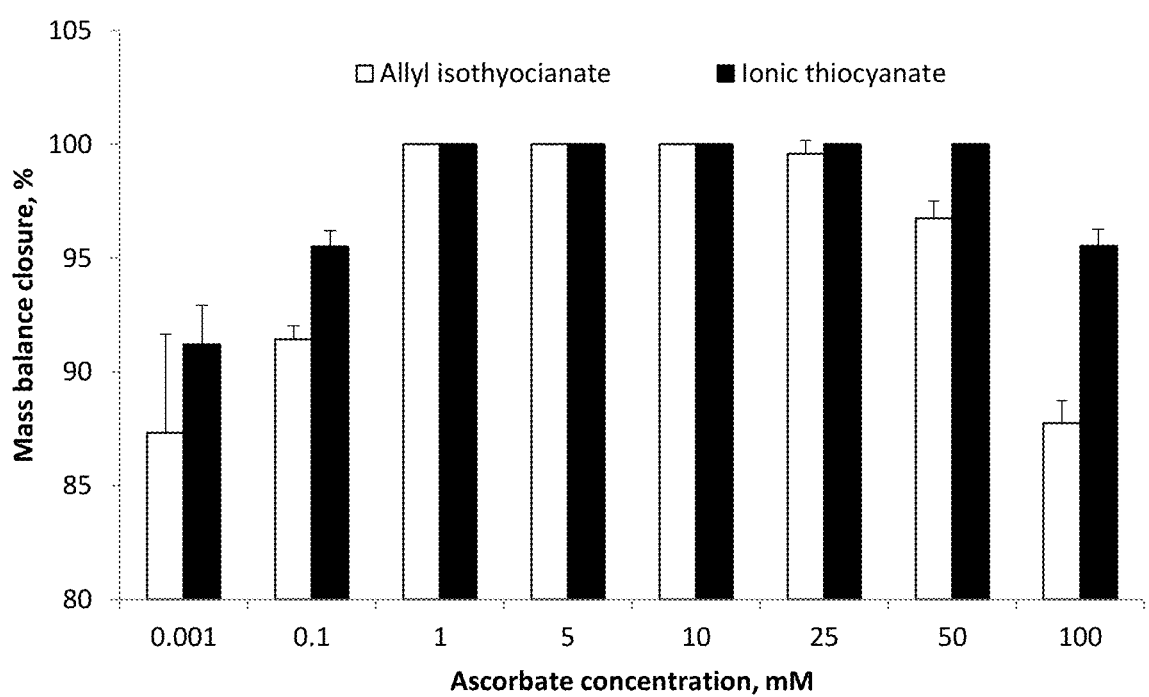
FIG. 7 is a plot of mass balance closure (%) versus ascorbate concentration (mM), illustrating the effect of ascorbate addition on the production of allyl isothiocyanate and ionic thiocyanate from *B. juncea* and *S. alba* mustard powder.

When ascorbic acid was added to the reaction mixture, almost quantitative release of allyl isothiocyanate and ionic thiocyanate was observed. Ascorbic acid acts as a co-factor for myrosinase and it is naturally present in mustard meal. However, with high glucosinolate concentrations present in mustard extracts, additional amounts of ascorbic acid are needed. Particularly, when 0.1-50 mM of ascorbic acid was added to the hydrolysis solution, all of sinalbin was converted to $SCN^-$, and all sinigrin was converted to allyl isothiocyanate (FIG. 7). With respect to FIG. 7, the mass balance closure represents the percentage of glucosinolate converted to the biologically active allyl isothiocyanate and ionic thiocyanate on a molar basis.

While it may be advantageous to maintain pH and ascorbic acid content in the hydrolysis mixture, it is also useful to carefully select mustard meal that will be used a source of myrosinase to assure high myrosinase activity. Mustard meal is typically obtained by cold pressing mustard seed for oil. During the pressing process, some of the myrosinase can be deactivated due to the local heat in the press. In fact, it has been estimated that myrosinase activity in some processed meals may be as little as less than 0.5% of the activity found in the unprocessed seed. Cold pressing and defatting with hexane to remove mustard oil does not affect the concentrations of glucosinolates, but affect the activity of myrosinase. Growth, harvest, and storage conditions can also affect the activity of the myrosinase. As a result, the amount of glucosinolates hydrolyzed is lower.

3. Optimization of Hydrolysis Time

The glucosinolate-myrosinase system is designed in such a way that the increase of water content in the plant coupled with the seed tissue rupture lead to the immediate hydrolysis reaction. Without being bound to a particular theory, the release of hydrolysis products may be a defense mechanism of mustard plants. When mustard extract is hydrolyzed under static conditions, it can take a substantial period of time for complete hydrolysis of glucosinolates, due to the significant higher concentrations of glucosinolates.

Figure 8:
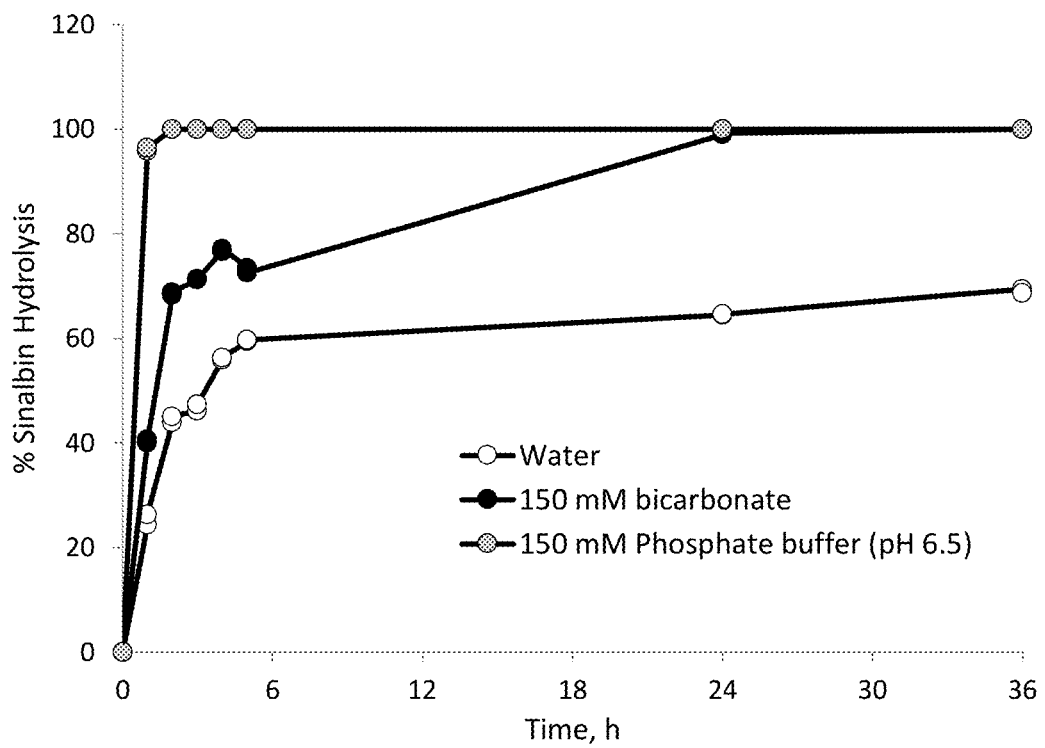
FIG. 8 is a plot of sinalbin hydrolysis (%) versus time (hours), illustrating the hydrolysis of *S. alba* and *B. juncea* mustard extracts (0.15 g) in the presence of mustard meal (0.1 g) in 2.5 mL of 150 mM phosphate buffer or 150 mM potassium bicarbonate.

Using phosphate and bicarbonate as buffering agent at final concentration of 150 mM, complete hydrolysis of sinalbin and sinigrin was observed in 24 hours (FIG. 8). Phosphate buffer allows for faster hydrolysis and all glucosinolates can be hydrolyzed under static condition in just 12 hours. Original pH of phosphate buffer is 6.5 and it coincides with the optimum pH for myrosinase. When potassium bicarbonate was used for maintaining pH, original pH was 9.5 and then reduces to 6.5 over the time as hydronium ions were released from glucosinolates. Since myrosinase activity at pH 9.5 is lower than that at pH 6.5, initial hydrolysis reaction rates were slower as compared to the phosphate buffered systems. When no buffering agent was used, hydrolysis rates were generally slower and incomplete hydrolysis was observed even after reaction time of 36 hours.

Faster release of biologically active compounds can shorten bioherbicide preparation time. However, slower release of biologically active compounds may be beneficial for better control of pests. For example, when sinigrin is hydrolyzed, fast release of allyl isothiocyanate may result in undesired loss of volatile allyl isothiocyanate. At the same time, if allyl isothiocyanate is released slowly over the time, allyl isothiocyanate has better changes to interact with potential pest and ultimately lead to the more efficient pest control.

Example 2

This example provides detail concerning seed meal preparation, determination of glucosinolate concentrations in defatted meal, release of 4-hydroxybenzyl glucosinolate from meal, and ionic thiocyanate production from 4-OH benzyl isothiocyanate.

All analyses and experiments were performed with meal remaining after seed from the *S. alba* cultivar IdaGold was cold pressed to remove approximately 90% of the oil. The remaining oil was removed by performing three extractions with petroleum ether that involved shaking 500 grams of the meal with 500 milliliters of petroleum ether and filtering through a Buchner funnel. The final filtration cake was washed with 250 milliliters of petroleum ether, allowed to air dry, and homogenized in a blender.

Sinalbin Content of the Meal.

The glucosinolate concentration of the defatted meal was determined using a method similar to that of the International Organization of Standardization. Defatted seed meal was weighed (200 mg) into 15-mL extraction tubes to which 500 mg of 3-mm glass beads, 10 milliliters of 70% methanol/water solution, and 100 µL of internal standard (4-methoxybenzyl glucosinolate, obtained from meadowfoam (*Limnanthes alba*) seed meal) were added. The detector response factor for 4-methoxybenzyl glucosinolate was determined by comparison with known concentrations of 2-propenyl glucosinolate having an assumed response factor of 1.0. Extraction tubes were shaken for 2 hours on a reciprocal shaker and centrifuged for 5 min at 1073 g to precipitate the seed meal. The extract solution was transferred to columns containing 250 mg of DEAE anion exchanger and allowed to drain freely. The columns were washed twice with 1 milliliter of deionized water and finally with 1 milliliter of 0.1 M ammonium acetate buffer (pH 4.0).

To the columns was then added 100 µL of a 1 mg/L sulfatase enzyme (Sigma-Aldrich, St. Louis, Mo.) solution and 100 µL of 0.1 M ammonium acetate buffer (pH 4.0). The columns were covered to prevent evaporation and allowed to stand with the enzyme for 12 hours, after which time the samples were eluted into HPLC autosampler vials with two consecutive 750-µL volumes of deionized water.

A Waters 2695 HPLC separation module coupled with a Waters 996 photodiode array detector (PDA) and Thermabeam Mass Detector (TMD) was used for glucosinolate analysis. For quantitative purposes all desulfoglucosinolates detected by PDA were measured at a wavelength of 229 nanometers. Separation was performed on a 250×2.00 mm, 5µ, 125 Å Aqua C18 column (Phenomenex, Torrance, Calif.). The flow rate was 200 µL/min, with a methanol gradient starting at 0.5% and increasing to 50%. Glucosinolates were identified using a combination of expected retention behavior (time, sequence) and mass spectra.

4-Hydroxybenzyl Isothiocyanate Release from *S. alba* Seed Meal.

Ten grams of the defatted meal were weighed into polypropylene centrifuge tubes to which was added 40 mL of deionized water. In one set of triplicate samples we added 10 milliliters of ethyl acetate as the extractant and 1 µL of decane (Sigma-Aldrich, St. Louis, Mo.) as the internal standard immediately after mixing the meal with deionized water. The mixtures were shaken, maintained at 22±2° C., and samples removed periodically during a 96-hour incubation period. In a second set of triplicate samples, the addition of 10 milliliters of ethyl acetate and 1 µL of decane were delayed until 30 minutes prior to each respective sampling time. At each sampling time the mixture was centrifuged for 10 minutes at 1677 g and 250 µL of the supernatant was withdrawn for analysis. GC-MS analysis was performed using an HP 5890A gas chromatograph equipped with a 30 m×0.32 mm i.d., 0.25 µm film HP-5MS capillary column (Agilent Technologies) coupled to an HP 5972 mass detector. Ethyl acetate extracts were manually injected into a split/splitless port (250° C., 20 s split) and temperature of the GC oven was programmed from 65° C. (isocratic 3 minutes) to 270° C. (isocratic 5 minutes) at a rate of 15° C./minute. Average linear flow rate of helium at 250° C. was 35 centimeters/minute. Data (total ion current) were corrected using decane as the internal standard and quantified using benzyl isothiocyanate as an external standard.

Extraction efficiencies for 2-propenyl, butyl, benzyl, and t-octyl isothiocyanates were determined by combining 10 µL of each in duplicate 40-milliliters deionized water samples. The samples were treated in the same manner as described above including both the immediate and delayed addition of ethyl acetate and decane. The amount of each analyte extracted using continuous or periodic extraction was determined using GC-MS as described for *S. alba* seed meal.

Stability of 4-Hydroxybenzyl Isothiocyanate in Buffered Media.

Partially purified 4-hydroxybenzyl isothiocyanate was prepared by suspending 500 grams of *S. alba* seed meal in 2 liters of deionized water and extracting the mixture with 500 milliliters of ethyl acetate for 24 hours. The ethyl acetate extract was separated by decanting the top organic layer after centrifugation, dried with 100 g of anhydrous sodium sulfate overnight, and concentrated under vacuum at laboratory temperature. The crude 4-hydroxybenzyl isothiocyanate extract was further purified by preparative column chromatography on silica gel (500 grams). Elution was achieved in a stepwise fashion using six 100-milliliter aliquots of eluent composed of pentane and methylene chloride at ratios of 100:0, 80:20, 60:40, 40:60, 20:80, and 0:100. Content of 4-hydroxybenzyl isothiocyanate within the fractions was verified by GC-MS using instrumentation and conditions as described previously. Fractions containing 4-hydroxybenzyl isothiocyanate were combined and concentrated under vacuum at laboratory temperature producing a yellowish, viscous fluid displaying only 4-hydroxybenzyl isothiocyanate and pentane/methylene chloride solvent peaks in the GC chromatogram. No further concentration of 4-hydroxybenzyl isothiocyanate was achieved using vacuum distillation because of its instability.

The pH stability of 4-hydroxybenzyl isothiocyanate was analyzed by incubating 25 μL of partially purified extract dissolved in 25 milliliters of eight different buffers with pH values ranging from 3.0 to 6.5 (FIG. 2). 0.1 M buffers were used, and were prepared by mixing 0.2 M sodium citrate and citric acid solutions in pre-calculated ratios ranging from 4 milliliters sodium citrate and 46 milliliters citric acid to 41 milliliters sodium citrate and 9 milliliters citric acid in a total volume of 100 milliliters. Actual pH values of the buffers of 3.03, 3.52, 4.02, 4.49, 5.00, 5.46, 5.91, and 6.52 were verified using an Orion model 420A pH meter (Orion Research, Boston). At specific times during the incubation a 1-milliliter sample was withdrawn from the buffered reaction solution with a syringe and injected into a Waters Integrity HPLC system (2695 separation module, 996 PDA, and TMD) equipped with a 150×2 mm i.d., 5 μm Aqua C-18 column (Phenomenex). The instrument was operated at a constant flow rate of 200 μL/min with a gradient from 5 to 35% of methanol during each 30-minute run. Half-lives for 4 hydroxybenzyl isothiocyanate were estimated from straight lines obtained by plotting the natural logarithm of the normalized concentration versus time (FIG. 2). This experiment was repeated twice with two different meal extracts acquired by the same procedures from the same seed material. Half-lives from only one of the experiments are reported since the results for both experiments were similar.

Release of SCN⁻ from *S. alba* Seed Meal.

Figure 9:
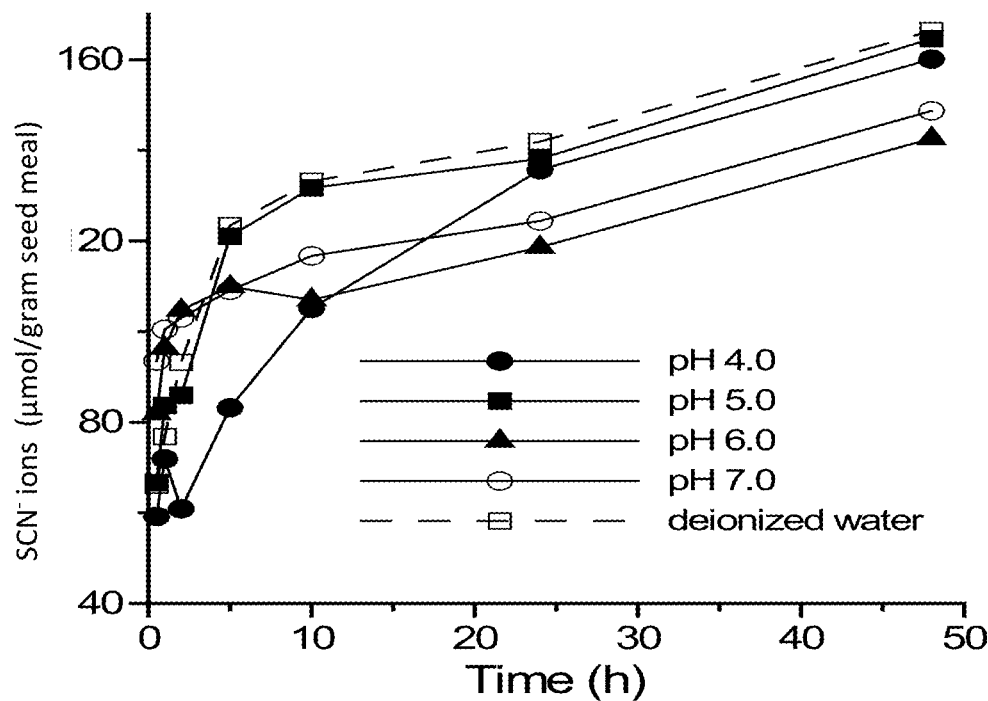
FIG. 9 illustrates the production of ionic thiocyanate (µmol/gram seed meal) versus time (hours), illustrating production of ionic thiocyanate from *S. alba* seed meal incubated in deionized water and aqueous solutions buffered at pH values ranging from 4.0 to 7.0.

Ten grams of defatted *S. alba* meal were weighed into a 250-mL, polyethylene bottle to which was added 200 milliliters of deionized water or a citrate buffer solution (pH of 4.0, 5.0, 6.0, or 7.0) prepared as described previously. The samples were placed on a reciprocating shaker for 48 hours during which time 5.0-milliliter aliquots were removed periodically to determine the time course of SCN⁻ release. Each 5-milliliter aliquot was placed in a 50-milliliter centrifuge tube and 40.0 milliliters of a methanol:deionized water (2:1, v:v) solution containing 1% acetic acid was added. The tubes were shaken vigorously for 15 minutes, centrifuged for 5 minutes at 1073 g, and 5 milliliters of the supernatant filtered through a 25-mm, 0.2-μm GD/X membrane (Whatman) into a beaker. One milliliter of the filtered sample was then transferred to an HPLC autosampler vial to which was added 0.50 milliliter of a 0.01 M $Fe^{3+}$ solution and 100 μL of a 0.1 M HCl solution. The vials were capped, shaken, and immediately analyzed using a Waters Integrity HPLC system equipped only with a 5-μm, 10×2 mm i.d. Aqua C-18 pre-column (Phenomenex). A 50-μL sample was injected and isocratically eluted using a 10% methanol solution pumped at a flow rate of 0.5 milliliter/minute. Absolute concentrations of SCN⁻ in the unknown samples were determined following the same procedure as described above, except that 10.0 grams of *S. alba* meal from which the glucosinolates had been removed with repeated methanol extraction was substituted for the unaltered meal. Amounts of a KSCN stock solution containing 10 to 100 μmol of SCN⁻ were added to the meal/buffer mixtures prior to the initial shaking and a separate standard curve prepared for each buffer pH (FIG. 9).

Glucosinolates in *S. alba* Meal.

As expected, sinalbin was the major glucosinolate in *S. alba* meal, constituting approximately 93% of total glucosinolate content. The measured concentration of sinalbin in defatted meal was 152±5.2 μmol/gram (mean value±variance of five replicates). The meal also included (2R)-2-hydroxybut-3-enyl glucosinolate (3.6 μmol/g) and five unidentified glucosinolate peaks with a total estimated glucosinolate concentration of approximately 6.4 μmol/g. Concentrations of indolyl glucosinolates that could potentially produce SCN⁻ as a result of hydrolytic instability of their respective isothiocyanates represented a total of only about 1 μmol/g of defatted seed meal. Simplicity of the glucosinolate profile in *S. alba* meal thus facilitates our ability to determine a likely precursor for glucosinolate hydrolysis products that might be identified. Most important is the fact that low concentrations of indolyl glucosinolates eliminate the possibility that these compounds can serve as precursors of significant amounts SCN⁻ that might be measured in hydrolyzed extracts.

4-Hydroxybenzyl Isothiocyanate Release from *S. alba* Seed Meal.

Figure 10:
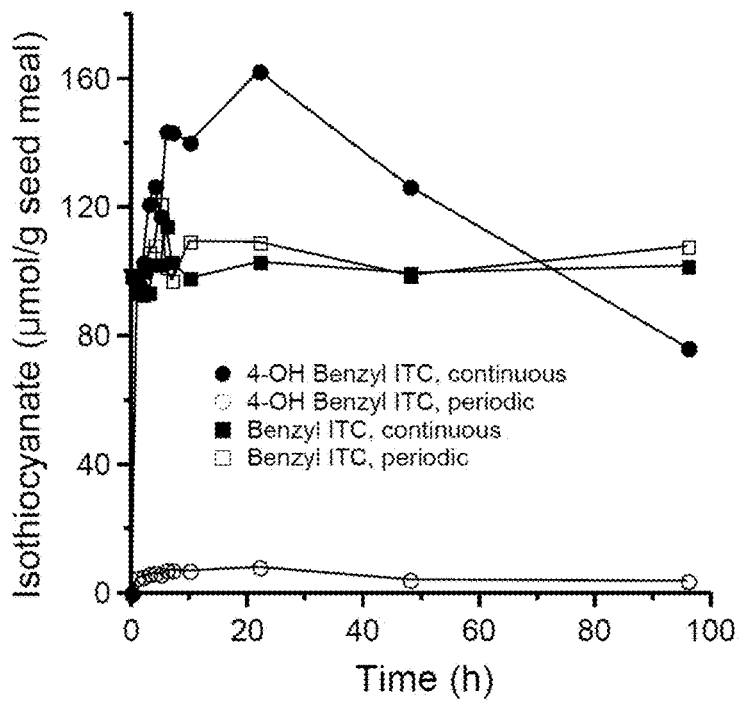
FIG. 10 is a plot of continuous and periodic extraction of 4-hydroxybenzyl isothiocyanate (µmol/gram seed meal) versus time (hours), showing continuous and periodic extraction into ethyl acetate of 4-hydroxybenzyl isothiocyanate resulting from hydrolysis of 4-OH benzyl glucosinolate contained in *S. alba* seed meal as compared to similar extractions of benzyl isothiocyanate from aqueous solution. 4-Hydroxybenzyl isothiocyanate incubations contained no seed meal, but are expressed on a weight basis for comparison purposes only.

A dramatic difference was observed between the relatively high yield of 4-hydroxybenzyl isothiocyanate obtained by continuously extracting into ethyl acetate as compared to periodic measurements made by adding ethyl acetate 30 minutes prior to each respective sampling time (FIG. 10). Maximum 4-hydroxybenzyl isothiocyanate extracted during the continuous procedure was 162 μmol/gram seed meal at 24 hours, whereas less than 10 μmol/gram was extracted at any one time in the periodic analyses. In contrast, when continuous and periodic extractions were performed with benzyl isothiocyanate, comparable concentrations of the compound were measured in the ethyl acetate extracts irrespective of the procedure. 2-Propenyl, butyl, and t-octyl isothiocyanates showed extraction yields similar to that of benzyl isothiocyanate ranging from at least 98% for all isothiocyanates in the continuous extraction to a low of 83% for 2-propenyl isothiocyanate in the periodic extraction.

These results establish that 4-hydroxybenzyl isothiocyanate is unstable in aqueous media, and that isolation and purification require the use of non-reactive solvents.

Stability of 4-Hydroxybenzyl Isothiocyanate in Buffered Aqueous Solutions.

Partially purified and concentrated seed meal extracts containing 4-hydroxybenzyl isothiocyanate were dissolved in buffers ranging from pH 3.0 to 6.5. The half-life of 4-hydroxybenzyl isothiocyanate at pH 6.5 was the shortest at 6 minutes, increasing to 16, 49, 100, 195, 270, 312, and 321 minutes with decreasing pH values of 6.0, 5.5, 5.0, 4.5, 4.0, 3.5, and 3.0, respectively (FIG. 2). Hydrolytic instability of 4-hydroxybenzyl isothiocyanate, especially at higher pH values, explains its low extractability in unbuffered extracts of seed meal that had a pH of 5.3 and a sampling time of 48 hours. Appreciable hydrolysis occurs at pH values as low as 3.0 and in a soil environment buffered at pH values typically between 5 and 7, significant amounts of SCN⁻ production are expected in a relatively short time period.

Ionic Thiocyanate Release from *S. alba* Seed Meal.

*S. alba* seed meal was incubated with deionized water and buffer solutions ranging from pH 4.0 to 7.0 to quantify SCN⁻ production resulting from 4-hydroxybenzyl glucosinolate hydrolysis in the presence of a full component of meal constituents (FIG. 9). SCN⁻ production occurred most slowly at pH 4.0, but final concentrations determined at 48 hours varied from a low at pH 6.0 of 143 and a high in deionized water of 166 μmol/gram seed meal. The amount of SCN⁻ expected based on 4-hydroxybenzyl glucosinolate concentration in the meal and the assumption of its complete stoichiometric conversion to SCN⁻ is approximately 152 μmol/g seed meal, thus indicating near complete conversion in 48 hours at all pH values.

Results obtained with seed meal incubations confirm conclusions reached using 4-OH benzyl glucosinolate extracts, clearly indicating that 4-hydroxybenzyl isothiocyanate is rapidly hydrolyzed to SCN⁻ at pH values expected in most soils. In contrast, data from previous investigations conducted with purified sinalbin and myrosinase indicate that decreased pH values promote the formation of 4-hydroxybenzyl cyanide at the expense of 4-hydroxybenzyl isothiocyanate, thereby decreasing subsequent formation of SCN⁻ by approximately 50% at pH 3.0 as compared to pH 7.0. The presence of additional meal components moderates the influence of pH on the production of 4-hydroxybenzyl cyanide, thus preserving SCN⁻ formation. Application of *S. alba* seed meal to soil with the addition of sufficient water to promote glucosinolate hydrolysis is expected to produce an amount of SCN⁻ stoichiometrically equivalent to the amount of 4-hydroxybenzyl glucosinolate within the meal.

SCN⁻ production in soils amended with *S. alba* seed meal has significant consequences with respect to phytotoxicity and the use of meal as a bioherbicide. The herbicidal activity of SCN⁻ is well known and commercial formulations containing NH₄SCN have been marketed. Amendment rates necessary for weed control have been determined by a number of investigators for NH₄⁺, K⁺, and Na⁺ salts with complete removal of all vegetative cover reportedly occurring for a period of 4 months when SCN⁻ was applied at rates of 270 to 680 kg/ha. Higher rates of 1,366 kg SCN⁻/ha were necessary for complete plant kill for 4 months, but a large percentage of the weeds were removed with only 137 kilograms SCN⁻/ha. Application rates were that might alter wheat germination, and it was found that 342 kilograms SCN⁻/ha caused inhibition, but that the effect was no longer observed at 69 days post application. Solutions of SCN⁻ sprayed directly on vegetative growth showed that cotton defoliation was possible using only 8.6 kilograms SCN⁻/ha.

Amounts of SCN⁻ contributed from *S. alba* seed meal used here, assuming complete stoichiometric conversion, would amount to 8.8, 17.7, and 35.3 kg SCN⁻/ha for amendment rates of 1000, 2000, and 4000 kilograms meal/ha, respectively. Although glucosinolate concentrations in the *S. alba* meal used were not reported, weed control effects have been observed with application rates of 1000 to 2000 kilograms/ha. Phytotoxicity also has been observed towards weed and crop species when meal was amended to greenhouse or field soils at rates from 1000 to 4000 kilograms meal/ha. SCN⁻ rates provided in *S. alba* meal, although not as high as those used previously in phytotoxicity studies with soluble salts, provide SCN⁻ in amounts of potential value in weed control.

In addition to weed control benefits afforded by SCN⁻ produced as a result of glucosinolate hydrolysis, the meals contain between 5 and 6% N that when mineralized represents an important nutrient source to crop plants. Organic agriculture may thus benefit from the use of *S. alba* meal as a soil amendment both through weed control and as a nutrient source. Potential environmental effects appear minimal given that biological degradation of SCN⁻ has been observed in soils and *S. alba* is typically grown as a condiment mustard for human consumption.

Glucosinolate concentrations in Brassicaceae seed meals as may be determined according to the method of this example are shown in Table 1 below.

TABLE 1

Glucosinolate concentrations in *Brassicaceae* seed meals.

| Glucosinolate R-group | *B. napus* "Athena" | *B. napus* "Sunrise" | *S. alba* "Ida Gold" | *B. juncea* "Pacific Gold" |
|---|---|---|---|---|
| | μmol g⁻¹ of sample | | | |
| (2R)-2-hydroxy-3-butenyl | 1.5 | 1.3 | 3.4 | 0.5 |
| 2-propenyl | | | | 123.8 |
| (2S)-2-hydroxy-3-butenyl) | 0.4 | | | |
| 2-hydroxy-4-butenyl) | 0.2 | | | 1.8 |
| (2R)-2-hydroxy-4-pentenyl | | | | 0.5 |
| 4-hydroxy-benzyl | | | 148.1 | |
| Unknown | | | 9.1 | |
| 3-butenyl | 2.8 | 2.7 | | |
| 4-hydroxy-3-indolylmethyl (0.28) | 11.3 | 10.9 | | 0.74 |
| unknown | | | 2.6 | |
| unknown | | | 0.74 | |
| 4-pentenyl | 1.3 | 1.4 | | |
| 3-indolylmethyl | 0.9 | 0.8 | | |
| 4-methylthiobutyl | 1.7 | | | |
| N-methoxy-3-indolylmethyl | | 0.1 | 0.01 | 0.6 |
| unknown | | | | 1.33 |
| TOTAL | 20.1 | 17.2 | 165.75 | 126.14 |

Highest glucosinolate concentrations were measured in *S. alba* IdaGold meal with 4-OH benzyl showing as the dominant glucosinolate. The *B. juncea* variety Pacific Gold had the next highest glucosinolate concentration, with propenyl glucosinolate dominating the total. It has been shown that both 4-OH benzyl and propenyl glucosinolates produce ITC as an end product of hydrolysis at typical soil pH values.

More recent evidence indicates that this assumption is not true for 4-OH benzyl glucosinolate. ITC production is significant since this compound is considered to be the most toxic of all glucosinolate hydrolysis products and thus most important in pest control. Recent results with weed seed bioassays prompted a reevaluation of this assumption and further prompted considering the inhibitory properties of other compounds, such as ionic thiocyanate.

The remaining *B. napus* varieties, Athena and Sunrise, were included as they routinely are used as an amendment in bioassay control experiments, and only low glucosinolate concentrations were present.

Example 3

An initial experiment was conducted to determine possible effects of *S. alba* seed meal on hatch of *Globodera pallida* eggs. Measuring the percentage egg hatch is a viability indicator and provides an indication of the potential impact from a treatment. In this experiment, *Globodera pallida* encysted eggs were exposed to *S. alba* seed meal for 2 weeks in small containers containing a sand:soil mix. The sand:soil mix without seed meal was used as the non-treated control. After a 2-week exposure, cysts were removed from the containers, and a hatching assay was conducted by placing eggs from each treatment into individual wells that contained either potato root diffusate (PRD) to stimulate hatch, or a soil extract (SE) that did not contain the hatching stimulus. The experiment had two treatments: 1) a non-treated bare soil control; or 2) *S. alba* seed meal. Each treatment included 5 replicates. Eggs from each of these treatments were exposed to either PRD or SE for 2 weeks, at which time hatched infectious $2^{nd}$ stage *Globodera pallida* juveniles (J2) were counted.

Figure 11:
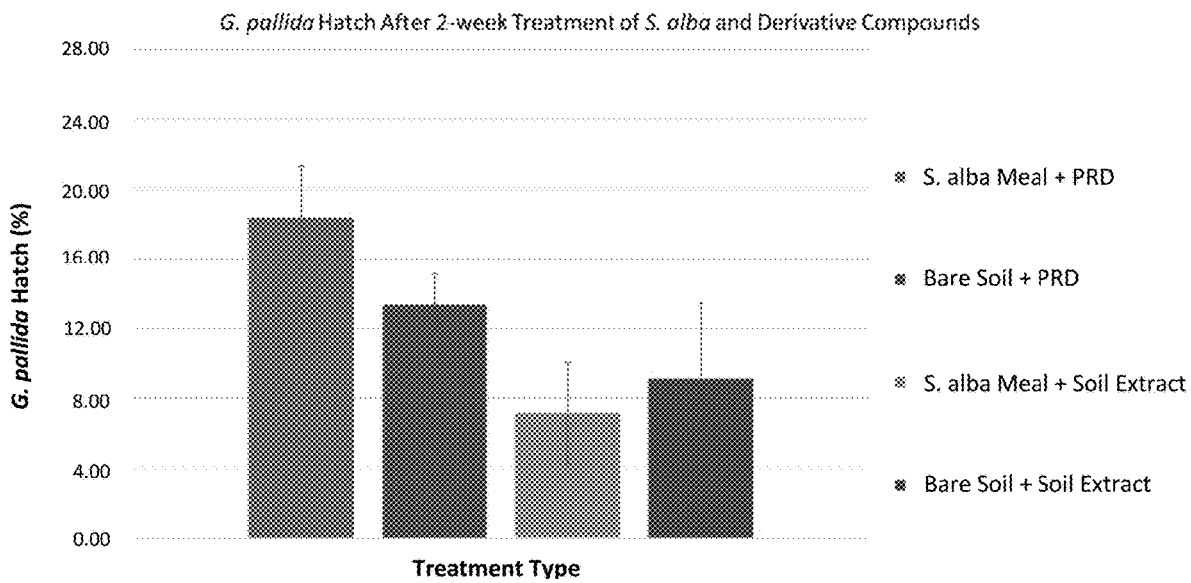
FIG. 11 is a graph of *Globodera pallida* hatch (%) versus treatment type, illustrating the percent *Globodera pallida* hatch after a 2-week exposure to *Sinapis alba* seed meal in either potato root diffusate (PRD) or in soil extract.

As FIG. 11 indicates, *Globodera pallida* hatch in PRD was greater after exposure to *S. alba* seed meal than hatch from the non-treated control (bare soil). As expected, hatch of the non-treated eggs was higher in PRD than from soil extract because PRD contains the hatching stimulus and soil extract does not. Percent hatch of eggs exposed to *S. alba* in soil extract did not differ from the non-treated eggs. But when exposed to PRD, approximately 30% more eggs hatched with prior exposure to *S. alba* seed meal compared to non-exposed eggs. This experiment was the first indication that *Globodera pallida* egg hatch could be enhanced by exposure to compounds found in yellow mustard seed meal.

Example 4

The objective of this experiment was to determine if 4-hydroxybenzyl alcohol (HBA), the product of enzymatic hydrolysis of the glucosinolate sinalbin contained in *S. alba* seed meal, could be responsible for the observed enhanced hatch. In an experiment similar to Example 1, encysted eggs were exposed to either HBA, or *S. alba* seed (yellow mustard) meal. The non-treated eggs were placed in bare soil mix only. After 2 weeks, exposed eggs were placed in hatching assays in either PRD or in soil extract, and hatched J2 were counted.

The results were similar to the results from Example 1 (FIG. 12). In the absence of the hatching stimulus found in PRD, percent hatch in soil extract was minimal for both non-treated eggs and eggs exposed to *S. alba* meal. Again, hatch of eggs exposed to *S. alba* meal was approximately 30% greater compared to non-treated control when hatched in the presence of the hatching stimulus found in PRD. 4-hydroxybenzyl alcohol had an even greater impact on hatch than *S. alba* meal alone; egg hatch was 50% higher when exposed to HBA prior to PRD exposure, than the non-treated control when hatched in PRD. As FIG. 12 indicates, the enzymatic hydrolysis product, 4-hydroxybenzyl alcohol, is the compound from *S. alba* meal that enhances *G. pallida* hatch.

Example 5

In this experiment, the impact of different application rates of HBA on percent *Globodera pallida* hatch was investigated (FIG. 13). Again, hatch of the non-treated control was higher in PRD than in soil extract. Exposure to HBA rates of 1 μmol/ml enhanced hatch of *Globodera pallida* more effectively than higher rates tested (2 μmol/ml, 4 μmol/ml, 8 μmol/ml). An increase in hatch of approximately 60% occurred with a 1 μmol/ml pre-treatment with HBA prior to PRD exposure. The enhanced hatch caused by 4-hydroxybenzyl alcohol was consistent in all experiments and demonstrated to be effective at different rates of application.

IX. Statements

The following numbered statements illustrate exemplary embodiments of the disclosed technology.

Statement 1. A method for controlling nematodes, comprising:

applying 4-hydroxybenzyl alcohol, *Sinapis alba* plant extract, *Sinapis alba* seed meal, or a combination thereof, to soil having, or at risk of having, nematode eggs, in an amount and manner sufficient to effect nematode egg hatch.

Statement 2. The method of statement 1, wherein the 4-hydroxybenzyl alcohol, *Sinapis alba* plant extract, *Sinapis alba* seed meal, or combination thereof, is applied in the presence of a trap crop.

Statement 3. The method of statement 2, wherein the trap crop is a solanaceous crop, a cruciferous crop, a grain crop, a tuber-forming, non-*Solanum* species, or a combination thereof.

Statement 4. The method of any one of statements 1-3, wherein the trap crop is a potato crop, tomato crop, tobacco crop, mustard crop, radish crop, or a combination thereof.

Statement 5. The method of any one of statements 1-3, wherein the trap crop is *S. sysimbriifolium, S. aethiopicum, S. quitoense, S. lycopersicoides, S. cercifolium, Brassica juncea, Sinapis alba, Radaphus sativus, Brassica napus, Chenopodium quinoa, Lupinus mutabilius, Ullucus tuberosum*, or a combination thereof.

Statement 6. The method of any one of statements 1-5, wherein applying the 4-hydroxybenzyl alcohol, *Sinapis alba* plant extract, *Sinapis alba* seed meal, or a combination thereof, to the soil in the presence of the trap crop comprises applying the 4-hydroxybenzyl alcohol, *Sinapis alba* plant extract, *Sinapis alba* seed meal, or combination thereof, to the soil from greater than zero to 3 feet from the trap crop.

Statement 7. The method of any one of statements 1-6, further comprising applying a hatching factor to the soil.

Statement 8. The method of statement 7, wherein the hatching factor comprises a potato hatching factor.

Statement 9. The method of statement 7 or statement 8, wherein the hatching factor comprises a potato root diffusate.

Statement 10. The method of any one of statements 7-9, wherein the hatching factor comprises a tomato root diffusate.

Statement 11. The method of any one of statements 7-10, wherein the hatching factor comprises a soybean root diffusate.

Statement 12. The method of any one of statements 7-11, wherein the hatching factor comprises a sugar beet root diffusate.

Statement 13. The method of any one of statements 7-12, wherein the hatching factor is applied substantially simultaneously with the 4-hydroxybenzyl alcohol, *Sinapsis alba* plant extract, *Sinapis alba* seed meal, or a combination thereof.

Statement 14. The method of any one of statements 7-12, wherein the hatching factor is applied from greater than zero to 6 months after application of the 4-hydroxybenzyl alcohol, *Sinapis alba* plant extract, *Sinapis alba* seed meal, or a combination thereof.

Statement 15. The method of any one of statements 1-14, further comprising applying a nematicide to the soil.

Statement 16. The method of statement 15, wherein the nematicide is a carbamate or an organophosphate.

Statement 17. The method of statement 15 or statement 16, wherein the nematicide is 2-Methyl-2-(methylthio)propanal O—(N-methylcarbamoyl)oxime, 2,2-Dimethyl-2,3-dihydro-1-benzofuran-7-yl methylcarbamate, Methyl 2-(dimethylamino)-N-[(methylcarbamoyl)oxy]-2-oxoethanimidothioate, 2-Methyl-2-(methylsulfonyl) propionaldehyde O-(methylcarbamoyl)oxime, O,O-Diethyl O[4-(methylsulfinyl)phenyl]phosphorothioate, 1-(ethoxypropylsulfanylphosphoryl)sulfanylpropane, (RS)—N-[Ethoxy-(3-methyl-4-methylsulfanylphenoxy)phosphoryl] propan-2-amine, *Streptomyces lydicus* WYEC 108, Dimethyl N, N' [thiobis[(methylimino)carbonyloxy]]bis [ethanimidothioate]/1-[(6-Chloro-3-pyridinyl)methyl]-N-nitro-2-imidazolidinimine] combination, *Bacillus firmus*, chitin+urea, S-Methyl 1,2,3-benzothiadiazole-7-carbothioate, Dimethyl (2aR,3S,4S,R,S,7aS,8S,10R,10aS,10bR)-10-(acetyloxy)-3,5-dihydroxy-4-[(1S,2S,6S,8S,9R,11S)-2-hydroxy-11-methyl-5,7,10-trioxatetracyclo[6.3.1.$0^{2,6}$.$0^{9,11}$] dodec-3-en-9-yl]-4-methyl-8-{[(2E)-2-methylbut-2-enoyl] oxy}octahydro-1H-furo[3',4':4,4a]naphtho[1,8-bc]furan-5, 10a(8H)-dicarboxylate, *Myrothecium* verrucaria fermentation products, *Paecilomyces lilacinus*, (RS)—S-sec-butyl-O-ethyl-2-oxo-1,3-thiazolidin-3-ylphosphonothioate, *Quillaja saponaria* saponins, 5-chloro-2-(3,4,4-trifluorobut-3-ene-1-sulfonyl)-1,3-thiazole, *Brassica juncea* extract, or a combination thereof.

Statement 18. The method of any one of statements 15-17, wherein the nematicide is applied substantially simultaneously with the 4-hydroxybenzyl alcohol, *Sinapis alba* plant extract, *Sinapis alba* seed meal, or a combination thereof.

Statement 19. The method of any one of statements 15-17, wherein the nematicide is applied from greater than zero to 6 months after application of the 4-hydroxybenzyl alcohol, *Sinapis alba* plant extract, *Sinapis alba* seed meal, or a combination thereof.

Statement 20. The method of any one of statements 1-19, wherein the nematode eggs are encysted eggs.

Statement 21. The method of any one of statements 1-20, wherein the nematode egg is a potato nematode egg.

Statement 22. The method of statement 21, wherein the potato nematode egg is the egg of a potato nematode selected from *Globodera achilleae, Globodera artemisiae, Globodera chaubattia, Globodera ellingtonae, Globodera hypolysi, Globodera leptonepia, Globodera millefolii, Globodera mirabilis, Globodera pallida, Globodera pseudorostochiensis, Globodera rostochiensis, Globodera tabacum, Globodera zelandica*, or a combination thereof.

Statement 23. The method of any one of statements 1-20, wherein the nematode egg is a soy nematode egg.

Statement 24. The method of statement 23, wherein the soy nematode egg is the egg of *Heterodera glycines*.

Statement 25. The method of any one of statements 1-20, wherein the nematode egg is a sugar beet nematode egg.

Statement 26. The method of statement 25, wherein the sugar beet nematode egg is the egg of *Heterodera schachtii*.

Statement 27. The method of any one of statements 1-20, wherein the nematode egg is the egg of a nematode selected from a *Globodera* species, *Heterodera* species, *Meloidogyne* species, *Pratylenchus* species, *Xiphenama* species, or a combination thereof.

Statement 28. The method of any one of statements 1-20, wherein the nematode egg is the egg of a nematode selected from *Globodera achilleae, Globodera artemisiae, Globodera chaubattia, Globodera ellingtonae, Globodera hypolysi, Globodera leptonepia, Globodera millefolii, Globodera mirabilis, Globodera pallida, Globodera pseudorostochiensis, Globodera rostochiensis, Globodera tabacum, Globodera zelandica, Heterodera carotae, Heterodera cruciferae, Heterodera humuli, Heterodera trifolii, Heterodera galeopsidis, Heterodera goettingiana, Heterodera betae, Heterodera sacchari, Heterodera cajani, Heterodera avenae, Heterodera filipjevi, Heterodera arenaria, Heterodera aucklandica, Heterodera bifenestra, Heterodera hordecalis, Heterodera iri, Heterodera latipons, Heterodera mani, Heterodera pratensis, Heterodera spinicauda, Heterodera turcomanica, Heterodera glycines, Heterodera schachtii, M. incognita, M. hapla, M. javanica, M. chitwoodi, M arenaria, M. naasi, M. acronea, M. artiellia, M. brevicauda, M. coffeicola, M. exigua, M. gajuscus, M enterolobii, M. partityla, M. thamesi, M. fallax, Pratylenchus alleni, Pratylenchus brachyurus, Pratylenchus coffeae, Pratylenchus crenatus, Pratylenchus dulscus, Pratylenchus fallax, Pratylenchus flakkensis, Pratylenchus goodeyi, Pratylenchus hexincisus, Pratylenchus loosi, Pratylenchus minutus, Pratylenchus mulchandi, Pratylenchus musicola, Pratylenchus neglectus, Pratylenchus penetrans, Pratylenchus pratensis, Pratylenchus reniformia, Pratylenchus scribneri, Pratylenchus thornei, Pratylenchus vulnus, Pratylenchus zeae, X. americanum, X. diversicaudatum, X. index, X. italiae, X. bakeri, X. brevicolle, X. insigne, X. rivesi, X. vuittenezi, X. brasiliense, X. hygrophylum, X. stenocephalum, X. elongatum, X. coxi, X. ingens, X. conurum, X. pachydermum, X. mammallatum, X. thorneanum, X. melitense, X. bacaniboia, X. surinamense, X. guirani, X. porosum, X. rotundatum, X. spinuterus, X. bergeri, X. douceti, X. nigeriense, X. attarodorum, X. clavicaudatum, X. elongatum, X. ifacolum, X. longidoroides, X. setariae, X. ifacolum, X. ebriense, X. pini, X. turcicum, X. basiria, X. marsupilami, X. malagasi, X. radicicola, X. longicaudatum, X. krugi, X. costaricense, X. filicaudatum, X. pachtaicum*, or a combination thereof.

Statement 29. The method of any one of statements 1-28, wherein applying the 4-hydroxybenzyl alcohol, *Sinapis alba* plant extract, *Sinapis alba* seed meal, or a combination thereof to the soil comprises applying an amount of *Sinapis alba* seed meal of from 500 lbs/acre to 4,000 lbs/acre.

Statement 30. The method of any one of statements 1-28, wherein applying the 4-hydroxybenzyl alcohol, *Sinapis alba* plant extract, *Sinapis alba* seed meal, or a combination thereof to the soil comprises applying an amount of *Sinapis alba* plant extract of from 50 lbs/acre to 1,000/acre.

Statement 31. The method of any one of statements 1-30, comprising applying 4-hydroxybenzyl alcohol to the soil.

Statement 32. The method of statement 31, wherein applying 4-hydroxybenzyl alcohol to the soil comprises applying an amount of 4-hydroxybenzyl alcohol of from greater than zero to 100 lbs/acre.

Statement 33. The method of statement 32, wherein the amount of 4-hydroxybenzyl alcohol applied to the soil is from 20 lbs/acre to 50 lbs/acre.

Statement 34. The method of any one of statements 31-33, comprising applying 4-hydroxybenzyl alcohol to the soil in the presence of the trap crop.

Statement 35. The method of any one of statements 31-34, comprising:

applying 4-hydroxybenzyl alcohol to the soil; and
applying a hatching factor to the soil.

Statement 36. The method of any one of statements 31-34, comprising:

applying 4-hydroxybenzyl alcohol to the soil; and
applying a nematicide to the soil.

Statement 37. The method of any one of statements 31-34, comprising:

applying 4-hydroxybenzyl alcohol to the soil; and
applying a nematicide and a hatching factor to the soil, substantially simultaneously, or sequentially in any order.

Statement 38. The method of any one of statements 1-37, wherein applying the 4-hydroxybenzyl alcohol comprises applying a formulation comprising a concentration of 4-hydroxybenzyl alcohol of from greater than zero to 6,000 μmol/mL.

Statement 39. The method of statement 38, wherein the concentration of 4-hydroxybenzyl alcohol is from 100 μmol/mL to 1,000 μmol/mL.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for controlling nematodes, comprising contacting soil where trap crop plants are cultivated, with 4-hydroxybenzyl alcohol, wherein the soil contains, or at risk of containing, nematode eggs, and wherein the 4-hydroxybenzyl alcohol is selectively applied to portions of the soil around a rooting area of the trap crop plants, to thereby affect nematode egg hatch, wherein the rooting area is from greater than zero and up to 3 feet from the trap crop plants, and subsequent migration of hatched nematode to roots of the trap crop plants.

2. The method of claim 1, wherein the trap crop plants are solanaceous trap crop plants, cruciferous trap crop plants, grain trap crop plants, tuber-forming trap crop plants, non-*Solanum* species trap crop plants, or a combination thereof.

3. The method of claim 1, wherein the contacting comprises selectively applying the 4-hydroxybenzyl alcohol, or selectively applying *Sinapis alba* plant extract, *Sinapis alba* seed meal, or combination thereof, to the rooting area of the trap crop plants.

4. The method of claim 1, further comprising applying a hatching factor, a nematicide, or both to the soil.

5. The method of claim 4, wherein the hatching factor comprises a potato hatching factor, a potato root diffusate, a tomato root diffusate, a soybean root diffusate, a sugar beet root diffusate, or any combination thereof.

6. The method of claim 4, wherein the hatching factor is applied substantially simultaneously with the 4-hydroxybenzyl alcohol, *Sinapis alba* plant extract, *Sinapis alba* seed meal, or a combination thereof, or the hatching factor is applied from greater than zero to 6 months after application of the 4-hydroxybenzyl alcohol, *Sinapis alba* plant extract, *Sinapis alba* seed meal, or a combination thereof.

7. The method of claim 4, wherein the hatching factor is applied to the soil a distance from greater than zero to 3 feet from a trap crop plant.

8. The method of claim 4, wherein the nematicide is applied substantially simultaneously with the 4-hydroxybenzyl alcohol, *Sinapis alba* plant extract, *Sinapis alba* seed meal, or a combination thereof.

9. The method of claim 4, wherein a hatch factor is applied substantially simultaneously with the 4-hydroxybenzyl alcohol, *Sinapis alba* plant extract, *Sinapis alba* seed meal, or combination thereof, and the nematicide.

10. The method of claim 4, wherein the nematicide is applied from greater than zero to 6 months after application of the 4-hydroxybenzyl alcohol, *Sinapis alba* plant extract, *Sinapis alba* seed meal, or a combination thereof.

11. The method of claim 4, wherein the hatch factor is applied from greater than zero to 6 months after application of the 4-hydroxybenzyl alcohol, *Sinapis alba* plant extract, *Sinapis alba* seed meal, or combination thereof.

12. The method of claim 1, wherein the nematode eggs are encysted eggs.

13. The method of claim 12, wherein the nematode egg is a potato nematode egg, a soy nematode egg, a sugar beet nematode egg, or a combination thereof.

14. The method of claim 1, wherein contacting the soil with the 4-hydroxybenzyl alcohol comprises applying an amount of *Sinapis alba* seed meal of from 500 lbs/acre to 4,000 lbs/acre to the soil.

15. The method of claim 1, wherein applying the 4-hydroxybenzyl alcohol to the soil comprises applying an amount of 4-hydroxybenzyl alcohol of from greater than zero to 100 lbs/acre.

16. The method of claim 1, wherein applying the 4-hydroxybenzyl alcohol comprises applying a formulation comprising a concentration of 4-hydroxybenzyl alcohol of from greater than zero to 6,000 μmol/mL.

17. A method, comprising:
   applying 4-hydroxybenzyl alcohol, *Sinapis alba* plant extract, *Sinapis alba* seed meal, or a combination thereof, to soil where trap crop plants are cultivated, and wherein the soil contains, or at risk of containing, nematode eggs, wherein the 4-hydroxybenzyl alcohol, *Sinapis alba* plant extract, *Sinapis alba* seed meal, or a combination thereof, is selectively applied around a rooting area of the trap crop plants, to thereby affect nematode egg hatch, wherein the rooting area is from greater than zero and up to 3 feet from the trap crop plants, and subsequent migration of hatched nematodes to the roots of the trap crop plants; and
   applying a nematicide and a hatching factor to the soil from greater than zero to 6 months after the 4-hydroxybenzyl alcohol, *Sinapis alba* plant extract, *Sinapis alba* seed meal, or a combination thereof is applied, the nematicide and the hatching factor being applied substantially simultaneously, or sequentially in any order.

18. The method of claim 1, wherein contacting the soil with 4-hydroxybenzyl alcohol comprises:
   selectively applying 4-hydroxybenzyl alcohol formulated in a solvent to the soil; or
   selectively applying *Sinapis alba* plant extract, *Sinapis alba* seed meal, or a combination thereof to the soil, wherein the 4-hydroxybenzyl alcohol is formed in situ around the rooting area of the trap crop; or
   a combination thereof.

* * * * *